United States Patent
Kim et al.

(10) Patent No.: US 12,336,031 B2
(45) Date of Patent: Jun. 17, 2025

(54) METHOD FOR PERFORMING MULTI-LINK COMMUNICATION IN WIRELESS COMMUNICATION SYSTEM

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Suhwook Kim, Seoul (KR); Sungjin Park, Seoul (KR); Taewon Song, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 376 days.

(21) Appl. No.: 17/781,698

(22) PCT Filed: Dec. 2, 2020

(86) PCT No.: PCT/KR2020/017459
§ 371 (c)(1),
(2) Date: Jun. 1, 2022

(87) PCT Pub. No.: WO2021/112557
PCT Pub. Date: Jun. 10, 2021

(65) Prior Publication Data
US 2023/0007535 A1    Jan. 5, 2023

(30) Foreign Application Priority Data

Dec. 2, 2019  (KR) .................. 10-2019-0158502
Dec. 2, 2019  (KR) .................. 10-2019-0158527
May 14, 2020  (KR) .................. 10-2020-0057852

(51) Int. Cl.
*H04W 28/08*    (2023.01)
*H04W 76/15*    (2018.01)
*H04W 84/12*    (2009.01)

(52) U.S. Cl.
CPC ............ *H04W 76/15* (2018.02); *H04W 84/12* (2013.01)

(58) Field of Classification Search
CPC ..... H04W 76/15; H04W 36/06; H04W 84/12; H04W 28/08; Y02D 30/70
See application file for complete search history.

(56) References Cited

U.S. PATENT DOCUMENTS 10,700,890 B1 *  6/2020  Kalyanaraman ........ H04L 41/12
2018/0206190 A1    7/2018  Cherian et al.
(Continued)

FOREIGN PATENT DOCUMENTS

KR   20180136892   12/2018
WO   2016159503   10/2016

OTHER PUBLICATIONS

Jeongki KIM, et al., "EHT Power saving considering multi-link", doc.: IEEE 802.11-19/1510r1, Sep. 2019, 17 pages.
(Continued)

Primary Examiner — Brian D Nguyen
(74) Attorney, Agent, or Firm — LEE, HONG, DEGERMAN, KANG & WAIMEY

(57) ABSTRACT

According to various embodiments, a multi-link device (MLD) may transmit, to an AP, a request frame for changing a primary link. On the basis of the request frame, the MLD may receive a response frame from the AP. On the basis of the response frame, the MLD may determine whether to change the primary link.

7 Claims, 34 Drawing Sheets

(56) References Cited

U.S. PATENT DOCUMENTS

| | | |
|---|---|---|
| 2019/0158385 A1 | 5/2019 | Patil et al. |
| 2022/0132423 A1* | 4/2022 | Fang ..................... H04W 76/20 |
| 2022/0264429 A1* | 8/2022 | Gan .................. H04W 52/0219 |
| 2022/0287121 A1* | 9/2022 | Hwang ................. H04W 76/15 |

OTHER PUBLICATIONS

PCT International Application No. PCT/KR2020/017459, International Search Report dated Mar. 2, 2021, 4 pages.

* cited by examiner (a)

| Multi-link STA ||| 
|---|---|---|
| 5GHz | 6GHz ||
| STA 1 Link 1 (PCH 1) | STA 2 Link 2 (PCH 2) | STA 3 Link 3 (PCH 3) |

FIG. 24

| The number of Primary Link | Link Identifier 1 | Link Identifier 2 | ... |
|---|---|---|---|

FIG. 25

| The number of Primary Link | Primary link Identifier | ... |

METHOD FOR PERFORMING MULTI-LINK COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2020/017459, filed on Dec. 2, 2020, which claims the benefit of earlier filing date and right of priority to Korean Application Nos. 10-2019-0158502, filed on Dec. 2, 2019, 10-2019-0158527, filed on Dec. 2, 2019, and 10-2020-0057852, filed on May 14, 2020, the contents of which are all incorporated by reference herein in their entirety.

BACKGROUND

Field of the Disclosure

The present specification relates to a technique for performing multi-link communication in a wireless LAN system, and more particularly, to a method for a power save mode (PS mode) in multi-link communication and an apparatus supporting the same.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Problem

In the EHT standard, in order to support high throughput and high data rate, a wide bandwidth (for example, 160/320 MHz), 16 streams, and/or multi-link (or multi-band) operation may be used.

In the EHT standard, the multi-link may include a primary link and a secondary link. A device supporting multi-link (that is, multi-link device) may designate one or more links among the multi-link as a primary link. The remaining links may operate as a secondary link.

Exchange of a management frame or a control frame may be performed only on the primary link. A higher load may be generated in the primary link than in the secondary link. Therefore, technical features for changing the primary link for load balancing may be required.

Technical Solutions

According to various embodiments, a multi-link device (MLD) including a first station (STA) and a second STA may perform the steps of transmitting, to an access point (AP) through the first STA related to a first link among a multi-link, a request frame for changing a primary link from the first link to a second link among the multi-link, wherein the request frame includes first information related to a link identifier (ID) of the second link; receiving a response frame based on the request frame from the AP through the first STA; and determining whether to change the primary link to the second link based on the response frame.

Technical Effects

According to various embodiments, the multi-link device may check the data traffic of the primary link and change the primary link based on the data traffic. Accordingly, there is an effect that the load between links can be similarly maintained in the multi-link.

In addition, according to various embodiments, there is an effect that a multi-link device can select a primary link suitable for its own data traffic or power amount by changing or adding a primary link according to a situation.

That is, since the multi-link device changes or requests to change the primary link, there is an effect of maintaining load balancing between links and reducing power consumption of STAs included in the multi-link device.

BRIEF DESCRIPTION OF THE DRAWINGS

FIG. 21 shows an example of the structure of a non-AP MLD.

FIG. 24 shows an example of a Primary Link Configuration element.

FIG. 25 shows an example of a primary link identifier bitmap.

DETAILED DESCRIPTION

Figure 1:
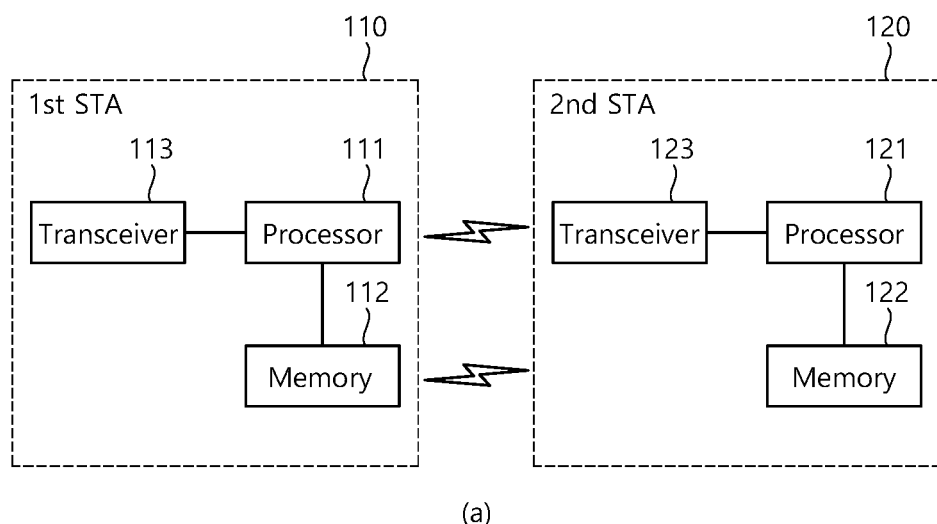
FIG. 1 shows an example of a transmitting apparatus and/or receiving apparatus of the present specification.
Figure 1:
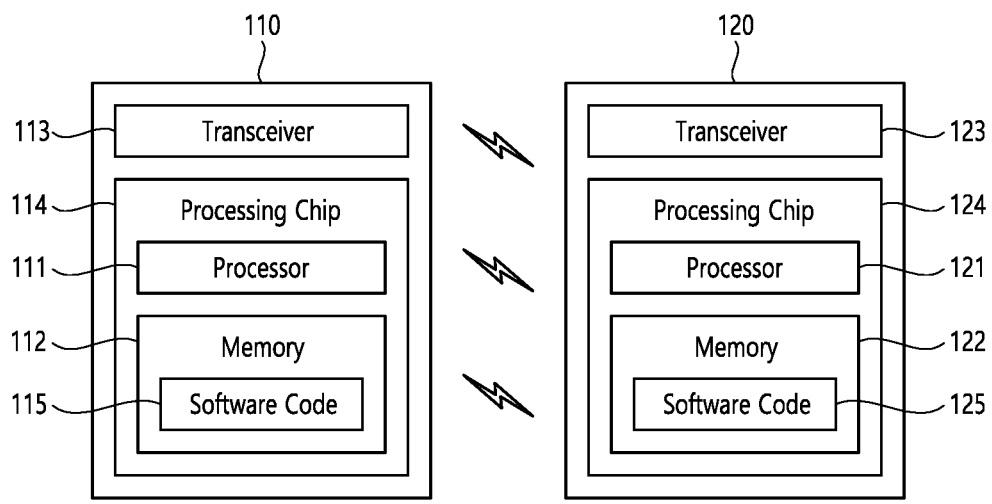

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power-saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
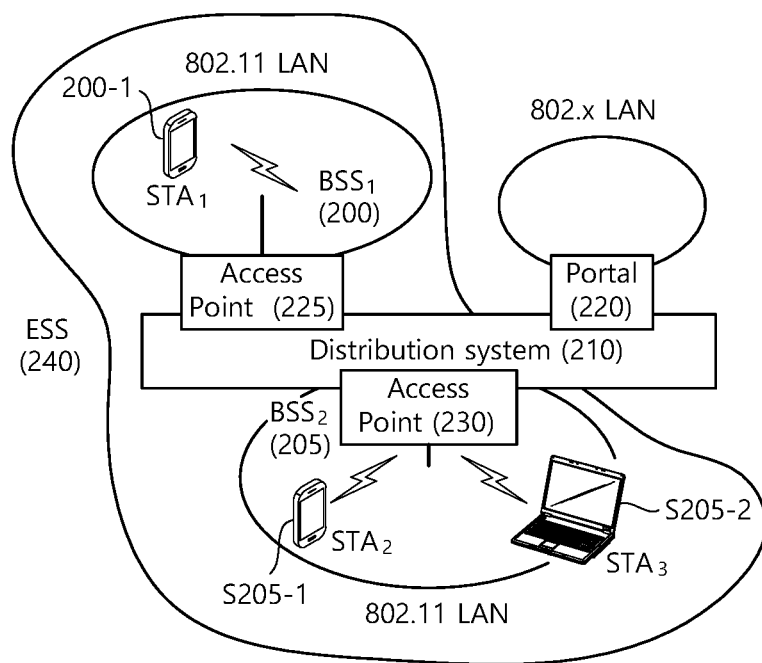
FIG. 2 is a conceptual view illustrating the structure of a wireless local area network (WLAN).
Figure 2:
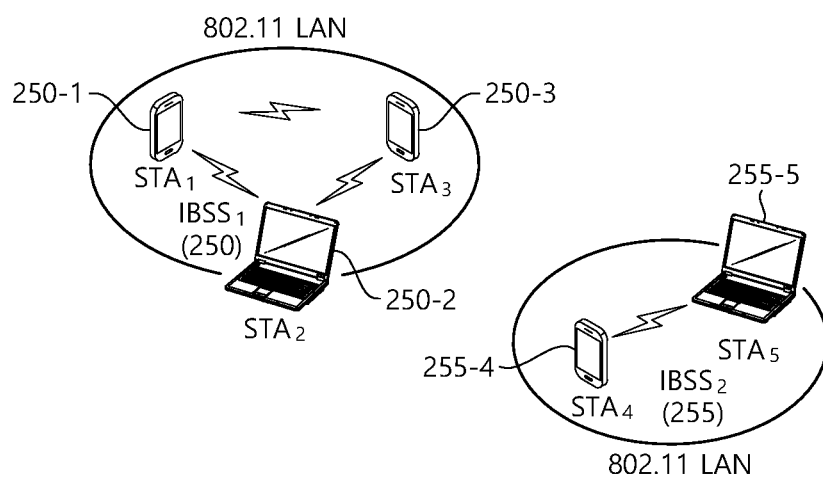

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
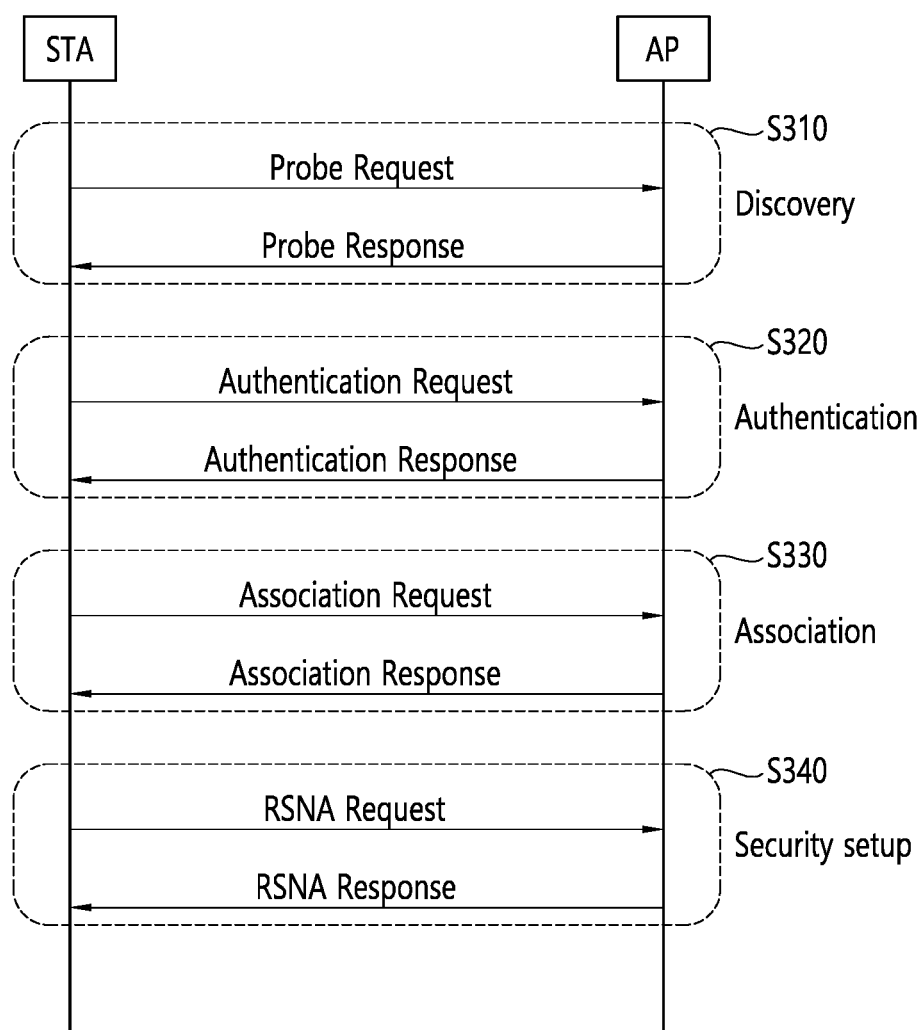
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
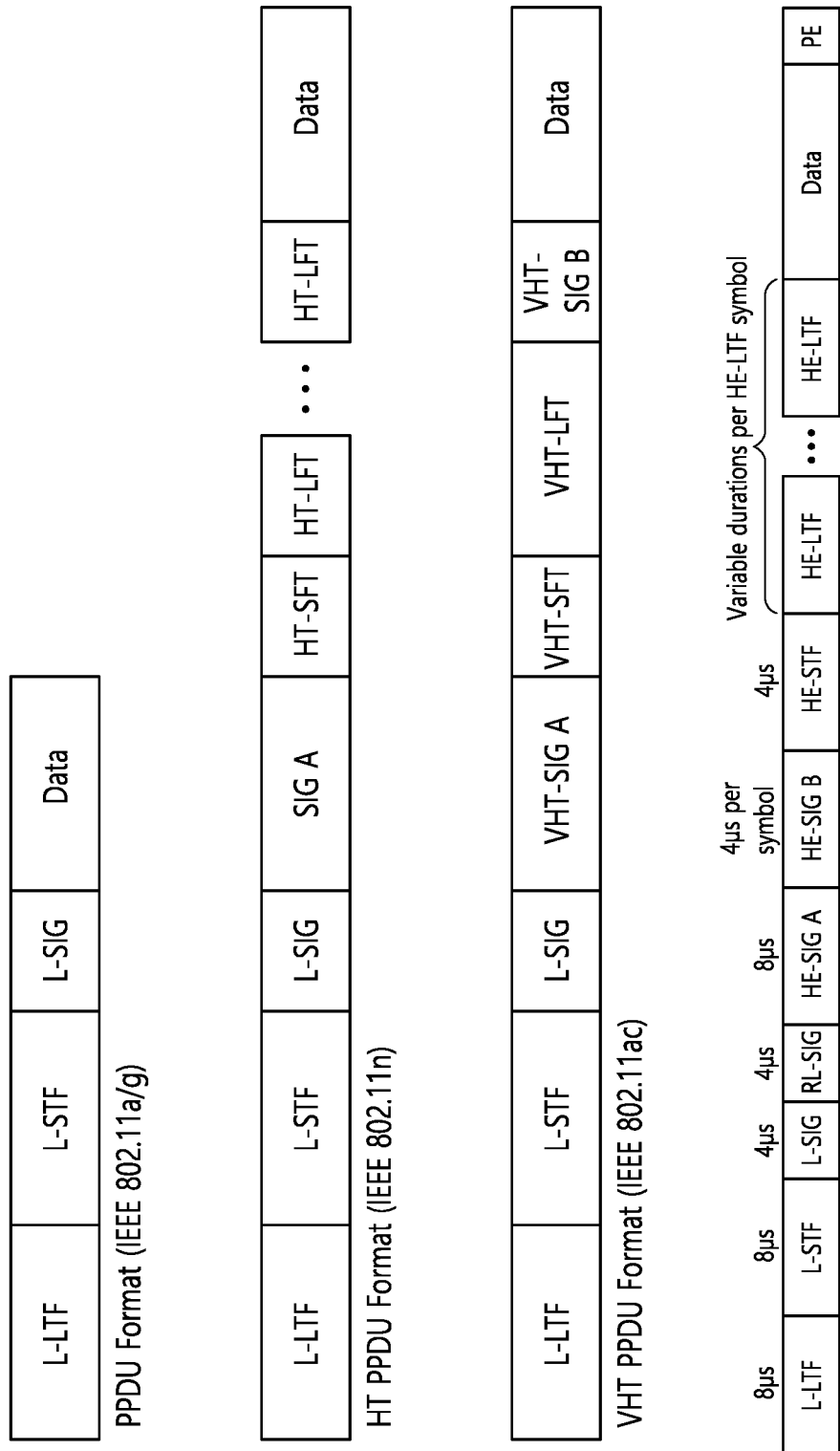
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
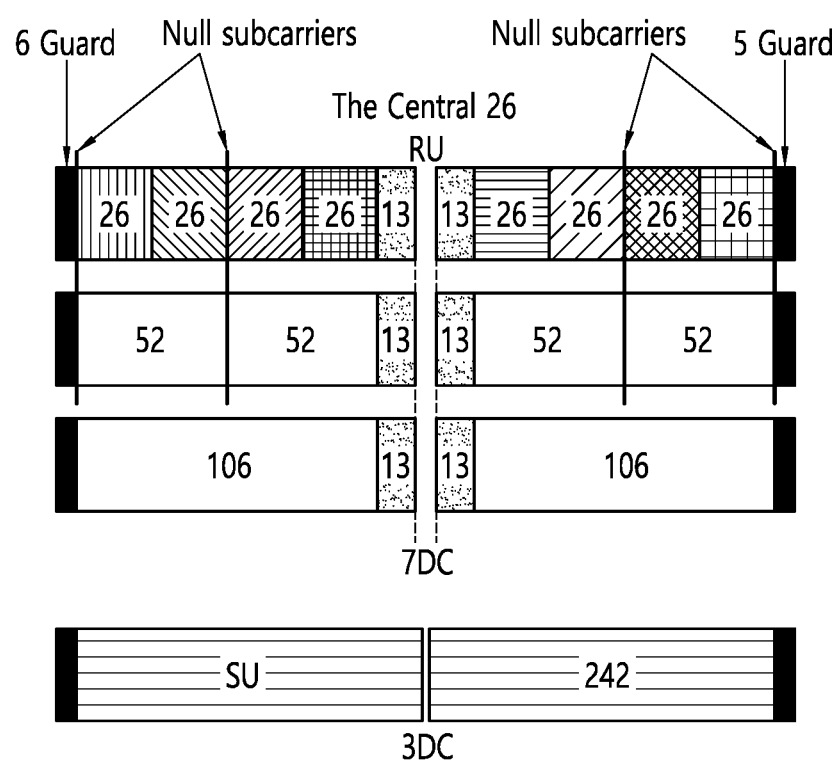
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
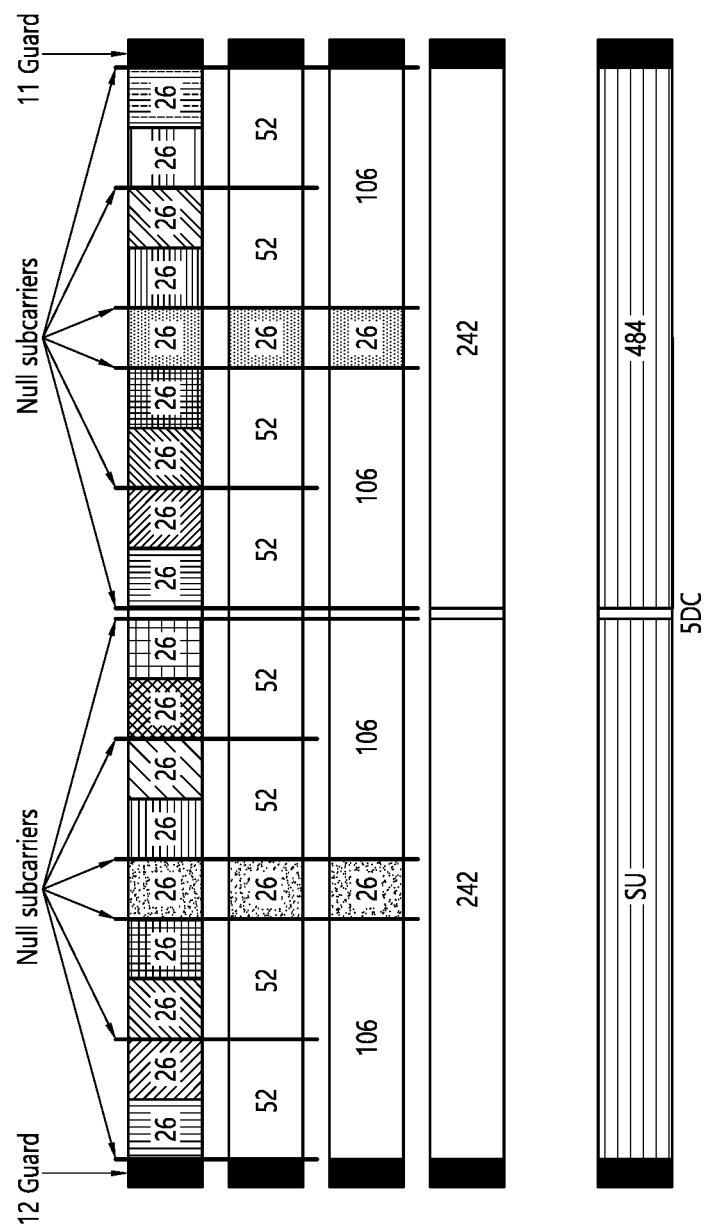
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
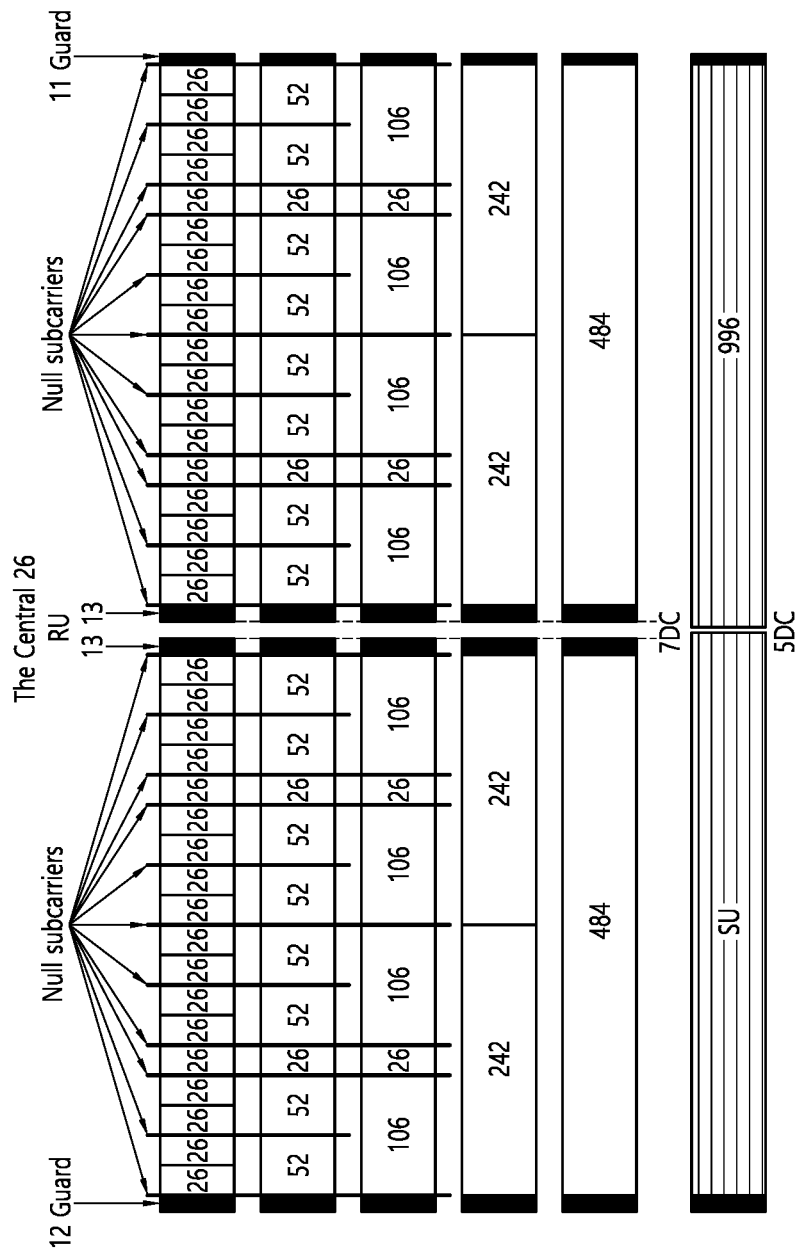
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
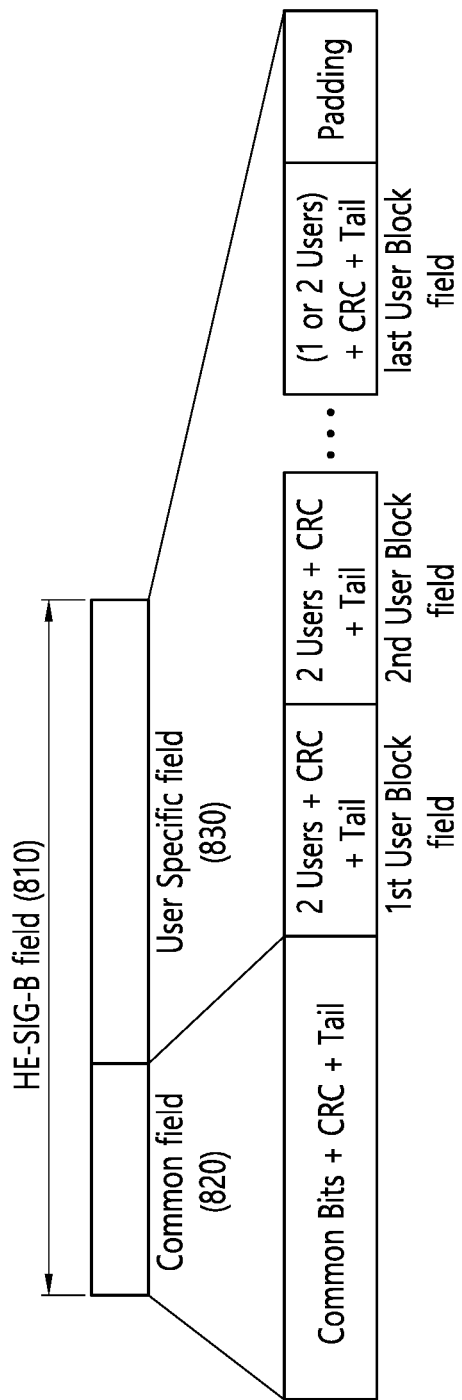
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |  | 1 |
| 00000010 | 26 | 26 | 26 | 26 | 26 | 52 |  | 26 | 26 | 1 |
| 00000011 | 26 | 26 | 26 | 26 | 26 | 52 |  | 52 |  | 1 |
| 00000100 | 26 | 26 | 52 |  | 26 | 26 | 26 | 26 |  | 1 |
| 00000101 | 26 | 26 | 52 |  | 26 | 26 | 26 | 52 |  | 1 |
| 00000110 | 26 | 26 | 52 |  | 26 | 52 |  | 26 | 26 | 1 |

TABLE 1-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000111 | 26 | 26 | 52 |  | 26 | 52 |  | 52 |  | 1 |
| 00001000 |  | 52 |  | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 hits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000y$_2$y$_1$y$_0$ |  | 106 |  |  | 26 | 26 | 26 | 26 | 26 | 8 |
| 0100ly$_2$y$_1$y$_0$ |  | 106 |  |  | 26 | 26 | 26 | 52 |  | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
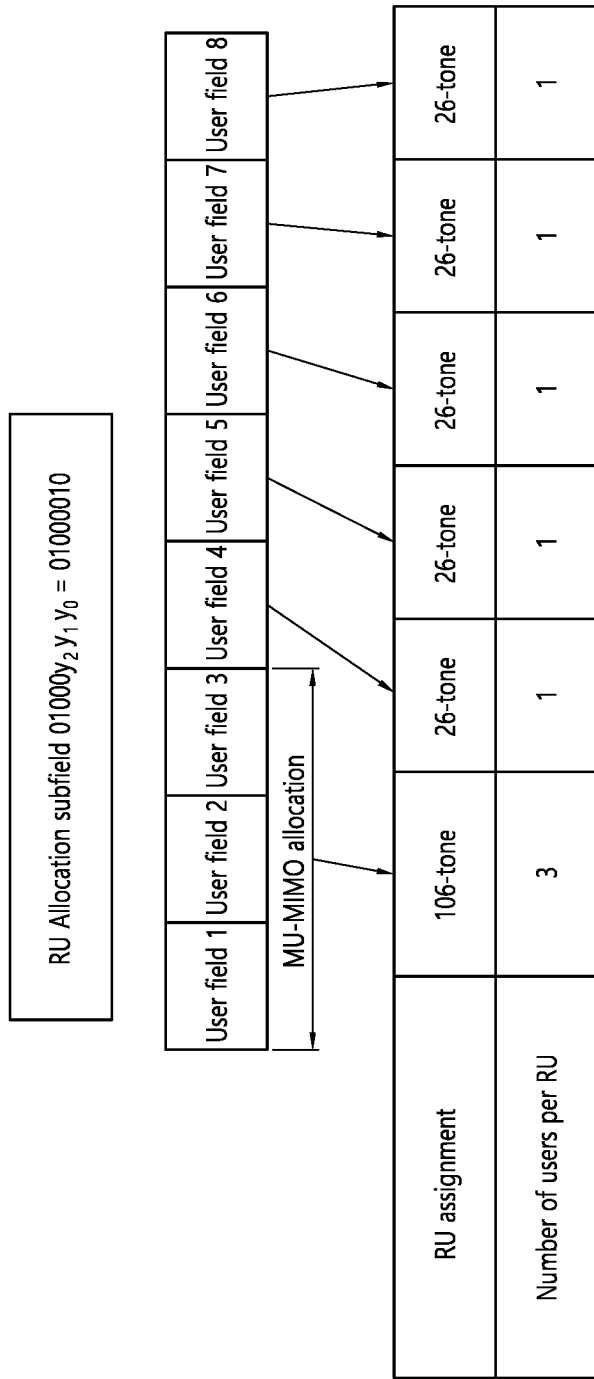
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
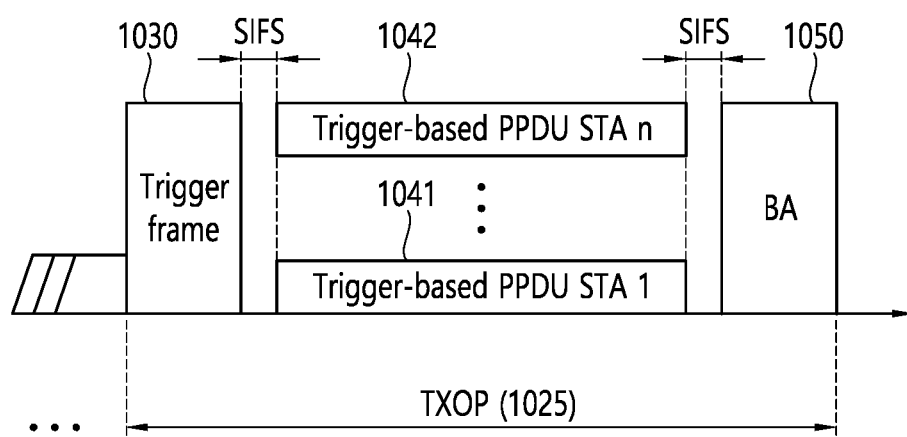
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
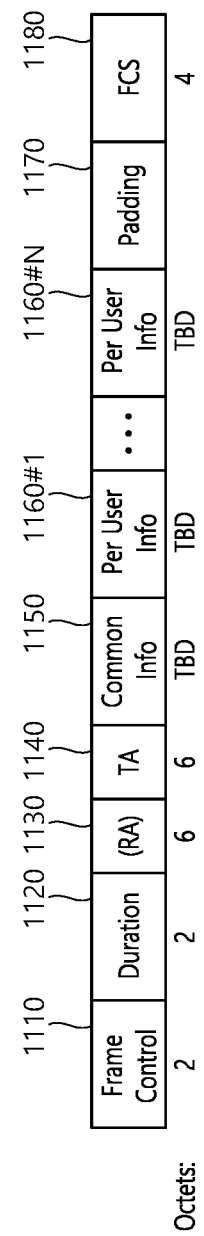
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
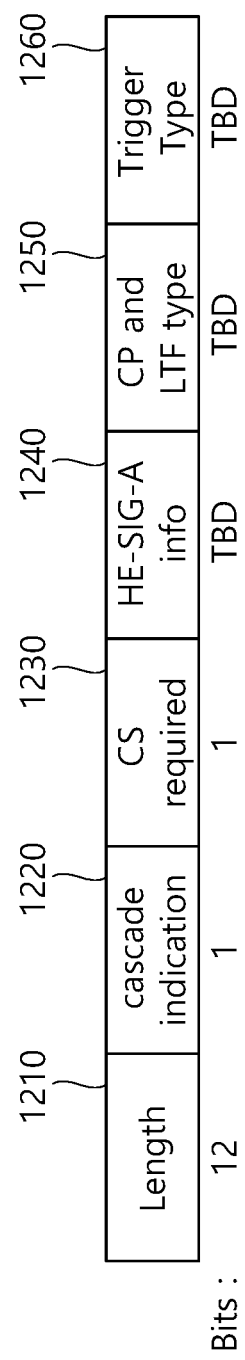
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
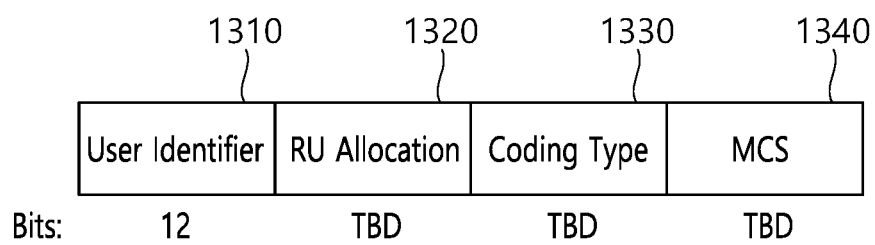
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
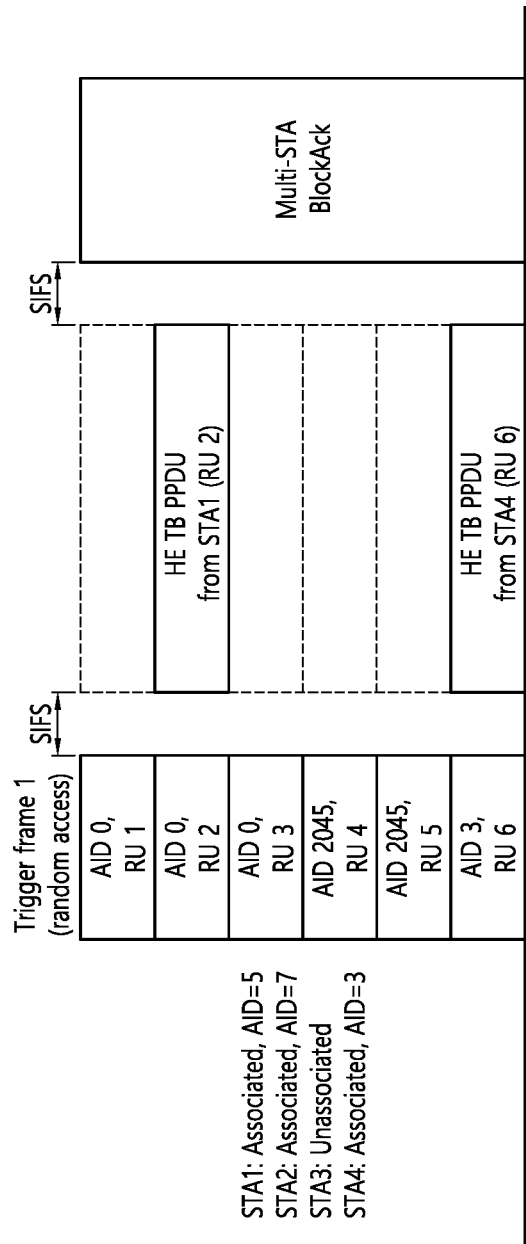
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
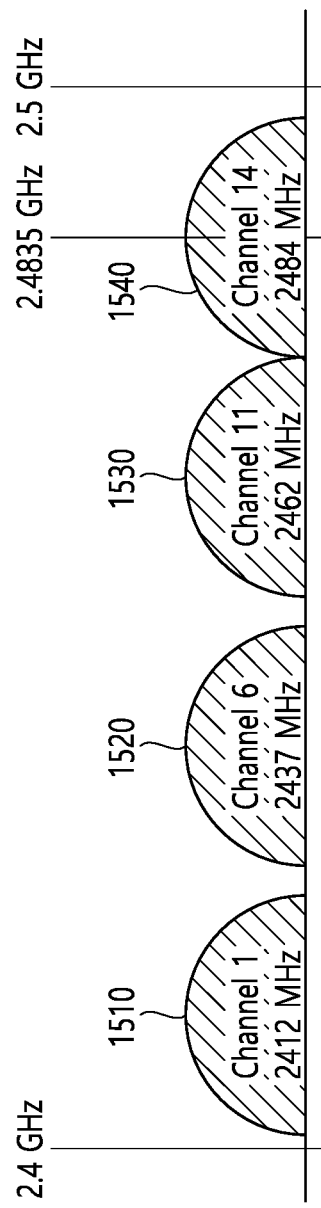
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
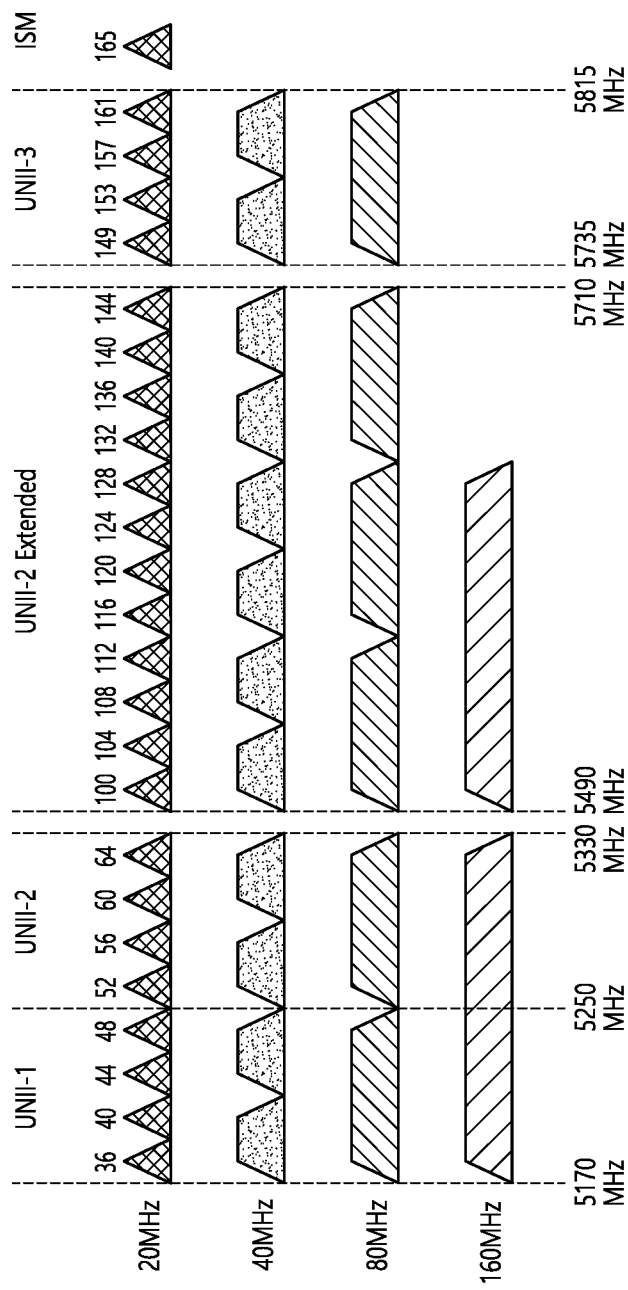
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
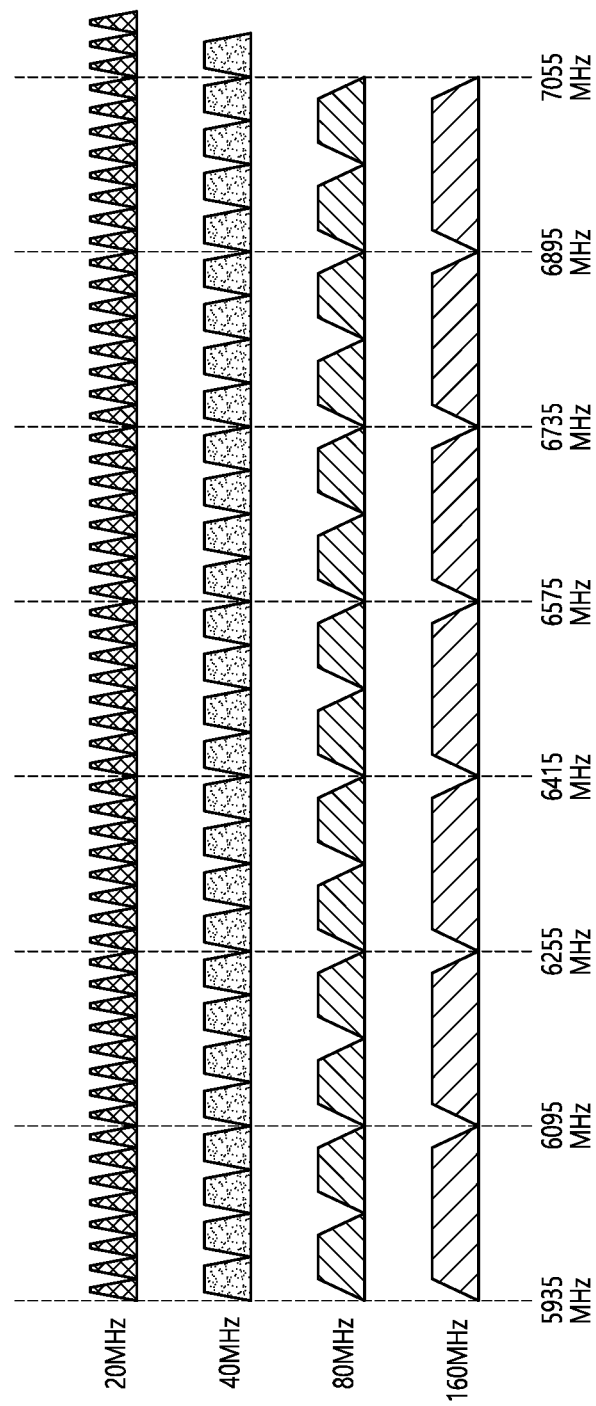
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | | 52 | 26 | 26 | 26 | 26 | 26 | 1 |
| 5 | 26 | 26 | | 52 | 26 | 26 | 26 | 52 | | 1 |
| 6 | 26 | 26 | | 52 | 26 | 52 | | 26 | 26 | 1 |
| 7 | 26 | 26 | | 52 | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |

TABLE 5-continued

| Indices | #1 | #2 | #3 | #4 | #5 | #6 | #7 | #8 | #9 | Number of entries |
|---|---|---|---|---|---|---|---|---|---|---|
| 12 | 52 | | | 52 | 26 | 26 | 26 | 26 | 26 | 1 |
| 13 | 52 | | | 52 | 26 | 26 | 26 | 52 | | 1 |
| 14 | 52 | | | 52 | 26 | 52 | | 26 | 26 | 1 |
| 15 | 52 | | | 52 | 26 | 52 | | 52 | | 1 |
| 16 | 26 | 26 | 26 | 26 | 26 | | 106 | | | 1 |
| 17 | 26 | 26 | | 52 | 26 | | 106 | | | 1 |
| 18 | 52 | | 26 | 26 | 26 | | 106 | | | 1 |
| 19 | 52 | | | 52 | 26 | | 106 | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | | 106 | | 26 | 26 | 26 | 26 | 26 | 1 |
| 21 | | | 106 | | 26 | 26 | 26 | 52 | | 1 |
| 22 | | | 106 | | 26 | 52 | | 26 | 26 | 1 |
| 23 | | | 106 | | 26 | 52 | | 52 | | 1 |
| 24 | 52 | | | 52 | — | 26 | 26 | 26 | 26 | 1 |
| 25 | | | 242-tone RU empty (with zero users) | | | | | | | 1 |
| 26 | | | 106 | | 26 | | 106 | | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2 * 996 | | | | | 8 |
| 59 | 26 | 26 | 26 | 26 | 26 | | 52 + 26 | | 26 | 1 |
| 60 | 26 | | 26 + 52 | | 26 | 26 | 26 | 26 | 26 | 1 |
| 61 | 26 | | 26 + 52 | | 26 | 26 | 26 | 52 | | |
| 62 | 26 | | 26 + 52 | | 26 | 52 | | 26 | 26 | |
| 63 | 26 | 26 | | 52 | 26 | 52 + 26 | | | 26 | 1 |
| 64 | 26 | | 26 + 52 | | 26 | 26 + 52 | | | 26 | 1 |
| 65 | 26 | | 26 + 52 | | 26 | 52 | | 52 | | 1 |

TABLE 7

| | | | | | | | | | | | |
|---|---|---|---|---|---|---|---|---|---|---|---|
| 66 | 52 | | 26 | 26 | 26 | | 26 + 52 | | | 26 | 1 |
| 67 | 52 | | | 52 | | 26 | | 26 + 52 | | 26 | 1 |
| 68 | 52 | | | 52 + 26 | | | 52 | | 52 | | 1 |
| 69 | 26 | 26 | 26 | 26 | | | 26 + 106 | | | | 1 |
| 70 | 26 | | 26 + 52 | | 26 | | | 106 | | | 1 |
| 71 | 26 | 26 | | 52 | | | 26 + 106 | | | | 1 |
| 72 | 26 | | 26 + 52 | | | | 26 + 106 | | | | 1 |
| 73 | 52 | | 26 | 26 | | | 26 + 106 | | | | 1 |
| 74 | 52 | | | 52 | | | 26 + 106 | | | | 1 |
| 75 | | | 106 + 26 | | | | 26 | 26 | | 26 26 | 1 |
| 76 | | | 106 + 26 | | | | 26 | 26 | | 52 | 1 |
| 77 | | | 106 + 26 | | | | 52 | | | 26 26 | 1 |
| 78 | | 106 | | | 26 | | 52 + 26 | | | 26 | 1 |
| 79 | | | 106 + 26 | | | | 52 + 26 | | | 26 | 1 |
| 80 | | | 106 + 26 | | | | 52 | | 52 | | 1 |
| 81 | | | 106 + 26 | | | | | 106 | | | 1 |
| 82 | | 106 | | | | | 26 + 106 | | | | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad \text{<Equation 1>}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112:16:112)=\{M\}*(1+j)/\text{sqrt}(2)$$

$$\text{EHT-STF}(0)=0 \quad \text{<Equation 2>}$$

The EHT-STF for the 40 MHz PPDU may be configured based on the following equation. The following example may be the first type (i.e., 1×STF) sequence.

$$\text{EHT-STF}(-240:16:240)=\{M,0,-M\}*(1+j)/\text{sqrt}(2) \quad \text{<Equation 3>}$$

The EHT-STF for the 80 MHz PPDU may be configured based on the following equation. The following example may be the first type (i.e., 1×STF) sequence.

$$\text{EHT-STF}(-496:16:496)=\{M,1,-M,0,-M,1,-M\}*(1+j)/\text{sqrt}(2) \quad \text{<Equation 4>}$$

The EHT-STF for the 160 MHz PPDU may be configured based on the following equation. The following example may be the first type (i.e., 1×STF) sequence.

$$\text{EHT-STF}(-1008:16:1008)=\{M,1,-M,0,-M,1,-M,0,-M,-1,M,0,-M,1,-M\}*(1+j)/\text{sqrt}(2) \quad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496:16:496)=\{-M,-1,M,0,-M,1,-M\}*(1+j)/\text{sqrt}(2) \quad \text{<Equation 6>}$$

Equation 7 to Equation 11 below relate to an example of a second type (i.e., 2× STF) sequence.

$$\text{EHT-STF}(-120:8:120)=\{M,0,-M\}*(1+j)/\text{sqrt}(2) \quad \text{<Equation 7>}$$

The EHT-STF for the 40 MHz PPDU may be configured based on the following equation.

$$\text{EHT-STF}(-248:8:248)=\{M,-1,-M,0,M,-1,M\}*(1+j)/\text{sqrt}(2)$$

$$\text{EHT-STF}(-248)=0$$

$$\text{EHT-STF}(248)=0 \quad \text{<Equation 8>}$$

The EHT-STF for the 80 MHz PPDU may be configured based on the following equation.

$$\text{EHT-STF}(-504:8:504)=\{M,-1,M,-1,-M,-1,M,0,-M,1,M,1,-M,1,-M\}*(1+j)/\text{sqrt}(2) \quad \text{<Equation 9>}$$

The EHT-STF for the 160 MHz PPDU may be configured based on the following equation.

$$\text{EHT-STF}(-1016:16:1016)=\{M,-1,M,-1,-M,-1,M,0,-M,1,M,1,-M,1,-M,0,-M,1,-M,1,M,1,-M,0,-M,1,M,1,-M,1,-M\}*(1+j)/\text{sqrt}(2)$$

$$\text{EHT-STF}(-8)=0, \text{EHT-STF}(8)=0,$$

$$\text{EHT-STF}(-1016)=0, \text{EHT-STF}(1016)=0 \quad \text{<Equation 10>}$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$\text{EHT-STF}(-504:8:504)=\{-M,1,-M,1,M,1,-M,0,-M,1,M,1,-M,1,-M\}*(1+j)/\text{sqrt}(2)$$

$$\text{EHT-STF}(-504)=0,$$

$$\text{EHT-STF}(504)=0 \quad \text{<Equation 11>}$$

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
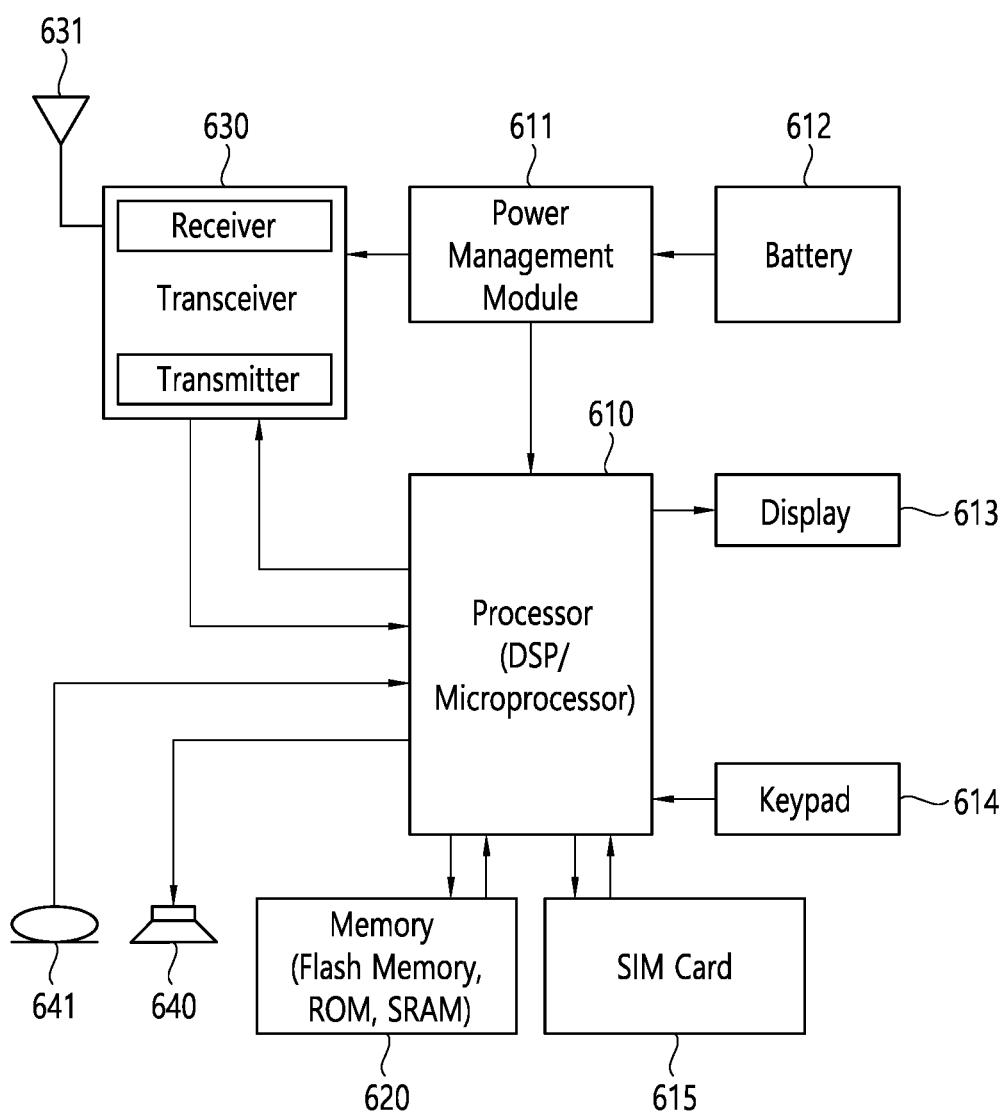
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Hereinafter, technical features of channel bonding supported by the STA of the present disclosure will be described.

For example, in an IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding for a primary 20 MHz channel (P20 channel) and a secondary 20 MHz channel (S20 channel). A backoff count/counter may be used in the channel bonding process. The backoff count value may be chosen as a random value and decremented during the backoff interval. In general, when the backoff count value becomes 0, the STA may attempt to access the channel.

During the backoff interval, when the P20 channel is determined to be in the idle state and the backoff count value for the P20 channel becomes 0, the STA, performing channel bonding, determines whether an S20 channel has maintained an idle state for a certain period of time (for example, point coordination function interframe space (PIFS)). If the S20 channel is in an idle state, the STA may perform bonding on the P20 channel and the S20 channel. That is, the STA may transmit a signal (PPDU) through a 40 MHz channel (that is, a 40 MHz bonding channel) including a P20 channel and the S20 channel.

Figure 20:
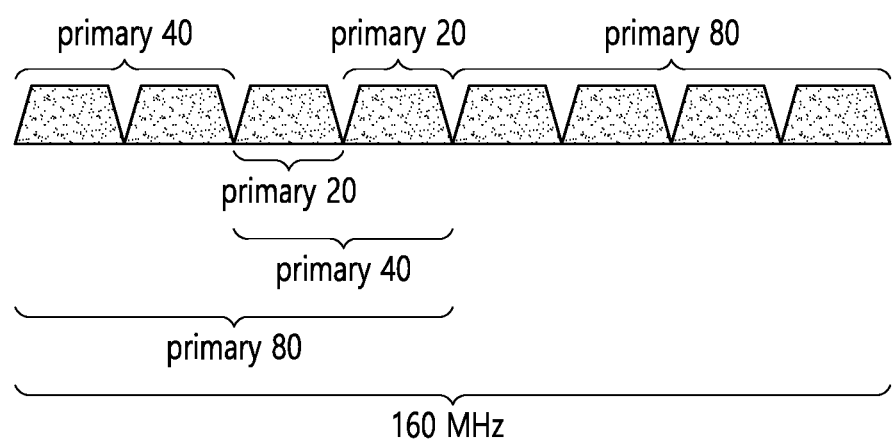
FIG. 20 shows an example of channel bonding.

FIG. 20 shows an example of channel bonding. As shown in FIG. 20, the primary 20 MHz channel and the secondary 20 MHz channel may make up a 40 MHz channel (primary 40 MHz channel) through channel bonding. That is, the bonded 40 MHz channel may include a primary 20 MHz channel and a secondary 20 MHz channel.

Channel bonding may be performed when a channel contiguous to the primary channel is in an idle state. That is, the Primary 20 MHz channel, the Secondary 20 MHz channel, the Secondary 40 MHz channel, and the Secondary 80 MHz channel can be sequentially bonded. However, if the secondary 20 MHz channel is determined to be in the busy state, channel bonding may not be performed even if all other secondary channels are in the idle state. In addition, when it is determined that the secondary 20 MHz channel is in the idle state and the secondary 40 MHz channel is in the busy state, channel bonding may be performed only on the primary 20 MHz channel and the secondary 20 MHz channel.

Hereinafter, preamble puncturing supported by an STA in the present disclosure will be described.

For example, in the example of FIG. 20, if the Primary 20 MHz channel, the Secondary 40 MHz channel, and the Secondary 80 MHz channel are all in the idle state, but the Secondary 20 MHz channel is in the busy state, bonding to the secondary 40 MHz channel and the secondary 80 MHz channel may not be possible. In this case, the STA may configure a 160 MHz PPDU and may perform a preamble puncturing on the preamble transmitted through the secondary 20 MHz channel (for example, L-STF, L-LTF, L-SIG, RL-SIG, U-SIG, HE-SIG-A, HE-SIG-B, HE-STF, HE-LTF, EHT-SIG, EHT-STF, EHT-LTF, etc.), so that the STA may transmit a signal through a channel in the idle state. In other words, the STA may perform preamble puncturing for some bands of the PPDU. Information on preamble puncturing (for example, information about 20/40/80 MHz channels/bands to which puncturing is applied) may be included in a signal field (for example, HE-SIG-A, U-SIG, EHT-SIG) of the PPDU.

Hereinafter, technical features of a multi-link (ML) supported by an STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown in FIG. 15, the 5 GHz band shown in FIG. 16, and the 6 GHz band shown in FIG. 17 (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one a management frame, a control frame, and a data frame.

When one STA supports a plurality of links, a transceiver supporting each link may operate as one logical STA. For example, one STA supporting two links could be expressed as one multi-link device (MLD) including a first STA for a first link and a second STA for a second link. For example, one AP supporting two links could be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (the AP MLD and/or the non-AP MLD) may transmit information about a link that the corresponding MLD can support through ML setup. Link information may be configured in various ways. For example, information about the link may include at least one of 1) information on whether the MLD (or STA) supports simultaneous RX/TX operation, 2) information on the number/upper limit of uplink/downlink links supported by the MLD (or STA), 3) information about the location/band/resource of the uplink/downlink link supported by the MLD (or STA), 4) information on available or preferred frame types (management, control, data, etc.) in at least one uplink/downlink link, 5) ACK policy information available or preferred in at least one uplink/downlink link, and 6) information on available or preferred traffic identifier (TID) in at least one uplink/downlink link. The TID is related to the priority of traffic data and is expressed as eight types of values according to the conventional wireless LAN standard. That is, eight TID values corresponding to four access categories (AC) (AC_BK(background), AC_BE(best effort), AC_VI(video), AC_VO(voice)) according to the conventional WLAN standard may be defined.

For example, it may be pre-configured in advance that all TIDs are mapped for uplink/downlink link. Specifically, when negotiation is not made through ML setup, all TIDs are used for ML communication. If the mapping between the uplink/downlink link and the TID is negotiated through additional ML settings, the negotiated TID may be used for ML communication.

A plurality of links usable by the transmitting MLD and the receiving MLD related to ML communication may be configured through ML setup, and this may be referred to as an "enabled link". The "enabled link" may be called differently in various expressions. For example, it may be referred to as various expressions such as a first link, a second link, a transmission link, and a reception link.

After the ML setup is completed, the MLD may update the ML setup. For example, the MLD may transmit information about a new link when it is necessary to update information about the link. Information on the new link may be transmitted based on at least one a management frame, a control frame, and a data frame.

According to an embodiment, the MLD may include anon-AP MLD and an AP-MLD. The non-AP MLD and the AP-MLD may be classified according to the function of an access point (AP). The non-AP MLD and the AP-MLD may be physically separated or logically separated. For example, when the MLD performs an AP function, it may be referred to as an AP MLD, and when the MLD performs an STA function, it may be referred to as a non-AP MLD.

According to an embodiment, in the EHT standard (that is, 802.11be), a multi-link may be divided into a Primary/Secondary link to reduce power consumption. APs supporting a multi-link can be managed by designating each link as a primary link or a secondary link. The AP can designate one or more links among several links as the Primary Link. Links other than primary links can operate as secondary links.

According to an embodiment, the primary link may mean a link that performs all functions of the link. In addition, the secondary link may mean a link that performs a limited function (for example, data frame exchange) for power-saving.

According to an embodiment, in the EHT standard, a multi-link may be divided into a general/power-saving link. The above-described primary link may correspond to a general link. In other words, the above-described primary link may be related to a general link. In addition, the above-described secondary link may correspond to a power-saving link. In other words, the above-described secondary link may be related to a power-saving link.

For example, the primary link may be used not only for frame exchange for synchronization but also for non-data frame exchange (that is, Control/Management frame exchange). The secondary link can only be used for data frame exchange.

Therefore, the STA can listen only to the primary link for receiving the Beacon and/or Control/Management frame during the idle time (or period). In other words, the STA may operate only in the primary link for receiving the Beacon and/or Control/Management frame during the idle time (or period). Therefore, a non-AP Multi-Link Device (MLD) must be connected to at least one primary link.

In the following specification, MLD may refer to a multi-link device. The MLD has one or more connected STAs and has one MAC service access point (SAP) that connects to an upper link layer (Logical Link Control, LLC). MLD may mean a physical device or a logical device. Hereinafter, a device may mean an MLD.

In addition, the MLD may include at least one STA connected to each link of the multi-link. For example, the processor of the MLD may control the at least one STA. For example, the at least one STA may be independently configured and operated. The at least one STA may include a processor and a transceiver, respectively. For example, the at least one STA may operate independently regardless of the processor of the MLD.

In the following specification, for the convenience of description, it is described that the MLD (or the processor of the MLD) controls at least one STA, but is not limited thereto. As described above, the at least one STA may transmit/receive a signal independently regardless of the MLD.

FIG. 21 shows an example of the structure of a non-AP MLD.

Referring to FIG. 21, the non-AP MLD may have a structure having a plurality of links. In other words, the non-AP MLD may support a plurality of links. The non-AP MLD may include a plurality of STAs. A plurality of STAs may have a link for each STA. FIG. 21 shows an example of a non-AP MLD structure, however, the structure of the AP MLD may be configured the same as that of the non-AP MLD shown in FIG. 21.

For example, the non-AP MLD may include STA 1, STA 2, and STA 3. STA 1 may operate in link 1. Link 1 may be included in the 5 GHz band. STA 2 may operate on link 2. Link 2 may be included in the 6 GHz band. STA 3 may operate on link 3. Link 3 may be included in the 5 GHz band. The band including link 1/2/3 may be an example, and may be included in 2.4, 5, and 6 GHz.

Hereinafter, operations of the AP MLD and the non-AP MLD in the primary link and the secondary link may be described. The non-AP MLD can perform management/control frame (for example, beacon frame) exchange and frame exchange for synchronization only through the primary link. Therefore, the STA connected through the primary link should always maintain the enabled state. For example, even when the power save mode is supported, the STA connected through the primary link should enter the awake state according to the Target Beacon Transmission Time (TBTT) to receive the Beacon frame.

Therefore, the operation of the primary link may require a relatively large load and a lot of power compared to the secondary link. On the other hand, the secondary link, in which data frame exchange does not occur, can enter the unavailable state (Disable or doze state). That is, power consumption in the secondary link can be reduced.

Operations of the above-described primary link and secondary link may be described with reference to FIG. 22.

Figure 22:
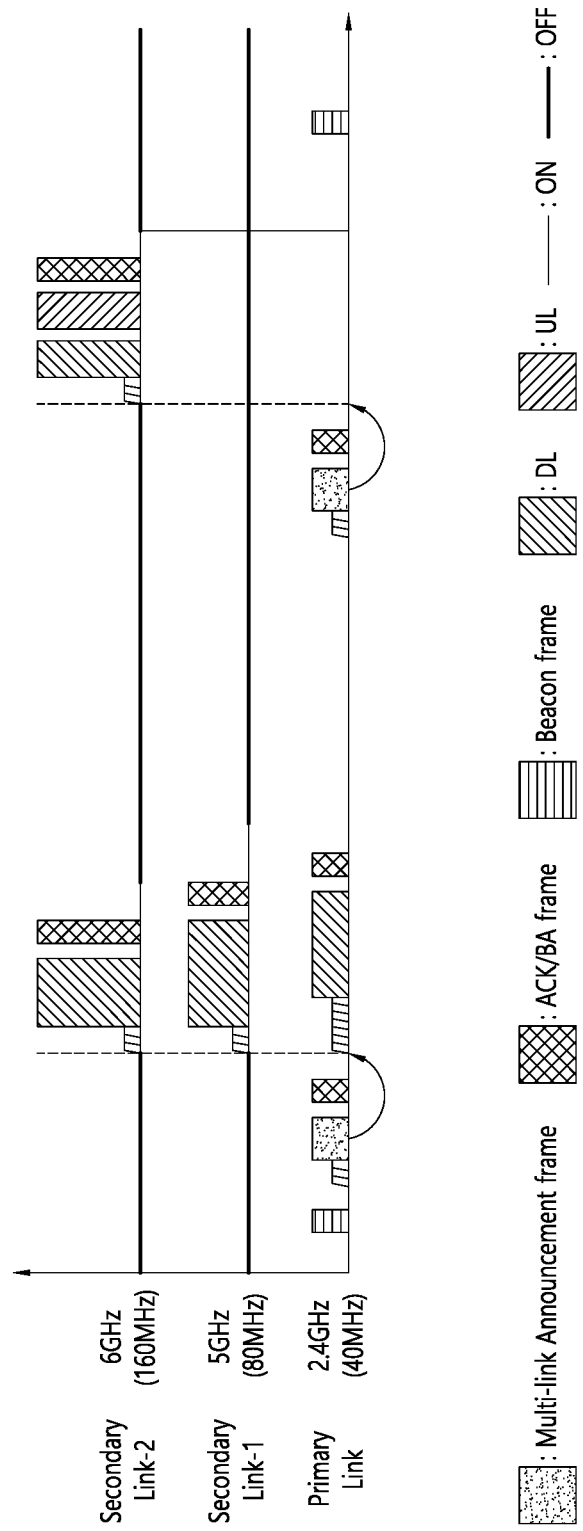
FIG. 22 shows an example of the operation of a primary link and a secondary link in a multi-link.

FIG. 22 shows an example of the operation of a primary link and a secondary link in a multi-link.

Referring to FIG. 22, the vertical axis may mean frequency, and the horizontal axis may mean time. In the primary link, the AP-MLD and the non-AP MLD may exchange Management/Control frames.

For example, a beacon frame, a multi-link announcement frame, and/or an ACK/BA frame may be transmitted/received in the primary link. Transmission and reception of data (for example, DL data, UL data) may be performed in both the primary link and the secondary link.

One AP (that is, AP MLD) configured based on the MLD structure may be connected to a plurality of STAs through a plurality of links. Due to the characteristics of the above-described primary link, load unbalancing may occur in which data traffic is concentrated on one link. In addition, when a management frame transmission for another STA occurs during DL transmission through the primary link, the transmission of the management frame to another STA may be delayed until the DL transmission is completed. The above-described problem may occur more seriously as the number of STAs connected to the AP increases and the amount of data traffic to be transmitted to the STAs increases.

Figure 23:
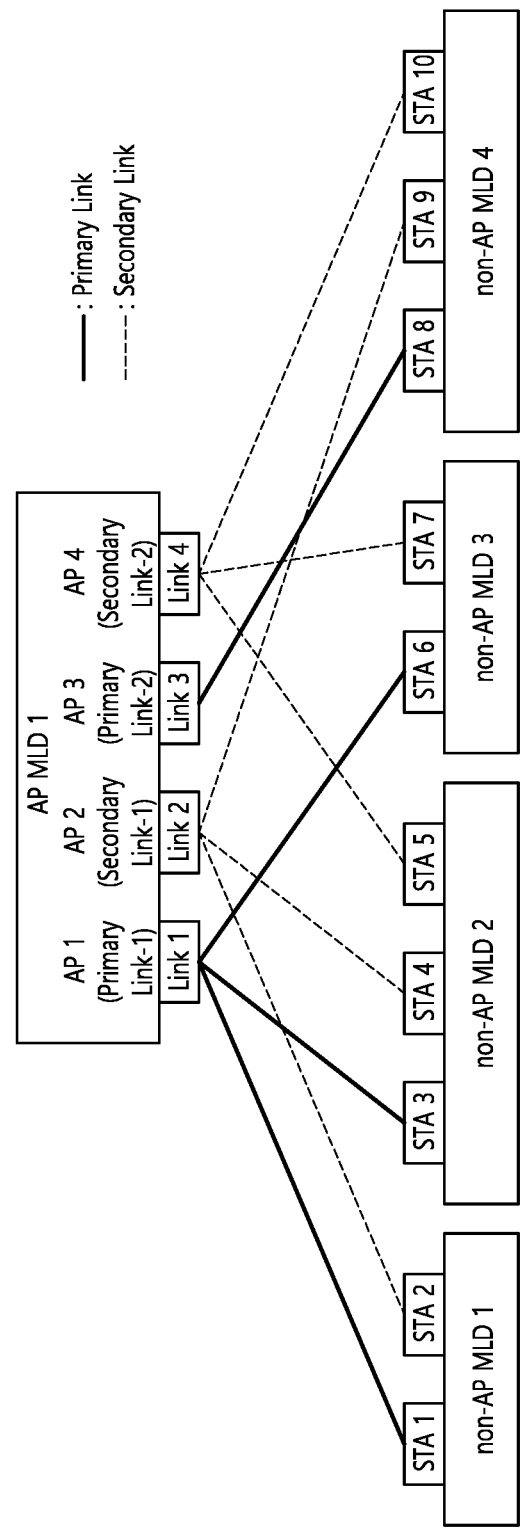
FIG. 23 shows an example of the configuration of a primary link and a secondary link in a multi-link.

FIG. 23 shows an example of the configuration of a primary link and a secondary link in a multi-link.

Referring to FIG. 23, a plurality of non-AP MLDs may be connected to AP MLD 1.

AP MLD 1 may include AP 1 to AP 4. For example, AP 1 may operate in link 1. In other words, AP 1 may be connected to link 1. AP 2 may operate in link 2. In other words, AP 2 may be connected to link 2. AP 3 may operate in link 3. In other words, AP 3 may be connected to link 3. AP 4 may operate on link 4. In other words, AP 4 may be connected to link 4.

The non-AP MLD 1 may include STA 1 and STA 2. STA 1 may operate in link 1. In other words, STA 1 may be connected to link 1. That is, STA 1 may be connected to AP 1. STA 2 may operate on link 2. In other words, STA 2 may be connected to link 2. That is, STA 2 may be connected to AP 2.

The non-AP MLD 2 may include STA 3, STA 4, and STA 5. STA 3 may operate on link 1. In other words, STA 3 may be connected to link 1. That is, STA 3 may be connected to AP 1. STA 4 may operate on link 2. In other words, STA 4 may be connected to link 2. That is, STA 4 may be connected to AP 2. STA 5 may operate on link 4. In other words, STA 5 may be connected to link 4. That is, STA 5 may be connected to AP 4.

The non-AP MLD 3 may include STA 6 and STA 7. STA 6 may operate on link 1. In other words, STA 6 may be connected to link 1. That is, STA 6 may be connected to AP 1. STA 7 may operate on link 4. In other words, STA 7 may be connected to link 4. That is, STA 7 may be connected to AP 4.

Non-AP MLD 4 may include STA 8, STA 9, and STA 10. STA 8 may operate in link 3. In other words, STA 8 may be connected to link 3. That is, STA 8 may be connected to AP 3. STA 9 may operate on link 2. In other words, STA 9 may be connected to link 2. That is, STA 9 may be connected to AP 2. STA 10 may operate on link 4. In other words, STA 10 may be connected to link 4. That is, STA 10 may be connected to AP 4.

For example, the AP MLD may support two primary links. For example, AP MLD 1 may allocate Link 1 and Link 3 as primary links.

In this case, non-AP MLDs (for example, non-AP MLD 1, non-AP MLD 2, non-AP MLD 3, and non-AP MLD 4) connected to AP MLD 1 should be connected to at least one primary link in order to receive a beacon frame.

In this example, STA1, STA 3, and STA 6 use Link 1 as a primary link, and STA 8 uses Link 3 as a primary link. And other STAs are connected to other Links (that is, Secondary Links) of AP MLD 1. Link 2 and link 4, which are secondary links, can be used only for data frame transmission.

For example, AP MLD 1 may transmit DL data to non-AP MLD 1 through Links 1 and 2. During the DL data transmission, a management frame for non-AP MLD 3 may occur in AP MLD 1. In this case, AP MLD 1 cannot transmit a management frame to non-AP MLD 3 because Link 1 is busy. Therefore, the transmission of the management frame may be delayed until the DL data transmission of Link 1 is completed (that is, until link 1 is in the idle state).

As in the above-described example, when multiple STAs use one primary link at the same time, data load unbalancing may occur and transmission efficiency may be reduced. In particular, this problem may occur more frequently when multiple non-AP MLDs are connected to one AP MLD or when the AP MLD has only one primary link to reduce power consumption.

Accordingly, in the following specification, technical features/embodiments for solving the above-described problems in an MLD environment supporting a multi-link may be described.

In general, the primary link of the STA may be determined after the association or association process. Each STA can listen only through the Primary Link during the idle period. For this, the link designated as the primary link can always maintain the enablement state. Therefore, the primary link may consume more power than the secondary link.

In addition, the primary link may be responsible for the management/control frame exchange of all STAs connected to the AP MLD. That is, more frame exchanges may occur in the primary link than in the secondary link. Therefore, the AP MLD should be able to reallocate the primary link to the STA for load balancing. In addition, the non-AP MLD must also be able to reassign its primary link for various reasons (link state change, data congestion prevention, etc.). In particular, in a Multi-Link Device (MLD) environment supporting a multi-link, it may be necessary to reassign the number of primary links based on data traffic or the OBSS transmission environment.

In order to solve the above-described problem occurring in the multi-link, in the following specification, a technical feature in which the AP MLD or the non-AP MLD changes the primary link may be proposed. An AP MLD or a non-AP MLD may exchange various information (for example, element or field) to change the Primary Link, and the names of various information to be described below are an example, and could be configured in various ways. In addition, the names of the primary link and the secondary link are also an example, and may be configured in various ways. For example, the primary link may be referred to as an anchor link.

As another example, the primary link may be referred to as a general link. The secondary link may be called a power-saving link. That is, an operation for changing a primary link is described below for the convenience of description, but the operation for changing a primary link could mean an operation for changing a general link into a power-saving link.

Element and Field to Change a Primary Link

According to an embodiment, elements and fields for changing the primary link may be newly proposed. Examples of newly proposed elements and fields may be described below.

(1) Primary Link Configuration Element

Each AP/STA of the MLD may include its own primary link configuration information in the Primary Link Configuration element. The Primary Link Configuration element may be transmitted while being included in a management frame (for example, a Beacon frame or a (re)Association Request/Response frame, etc.).

Instruction for the Primary Link Configuration can be basically performed through the Primary Link Configuration element. For example, the Primary Link Configuration element may include element and/or field information proposed below. Element and/or field information proposed below may be changed or added as needed. For example, the Primary Link Configuration element may include information on the Primary Link to be changed by the AP/STA as a Field.

i) Primary link number field (or information): the total number of primary links supported by the AP/STA ii) Primary link Identifier field (or information): an identifier for identifying the Link. The Primary Link Identifier may include link information currently used as a primary link. Link information currently used as a primary link may be indicated by one bitmap or defined by several bits. The Primary Link Identifier may include information on the Primary Link List currently supported by the AP MLD.

According to an embodiment, the primary link configuration element may be configured differently according to circumstances.

For example, when information on the primary link configuration is transmitted, the primary link configuration element may include the total number of primary links supported by the AP/STA and link information currently used as the primary link.

For another example, when information for changing a primary link is transmitted, the primary link configuration element may include the total number of primary links that the AP/STA wants to change and link information that the AP/STA wants to change to the primary link.

FIG. 24 shows an example of a Primary Link Configuration element.

Referring to FIG. 24, the Primary Link Configuration element may include the number of primary link information (or a field), link identifier 1 information (or a field), or link identifier 2 information (or a field).

For example, the number of primary link information (or a field) may include information on the number of primary links supported by the AP or STA. For example, link identifier ½ information (or a field) may be changed based on the number of links used as primary links.

FIG. 25 shows an example of a primary link identifier bitmap.

Referring to FIG. 25, the primary link identifier bitmap may include the number of primary link information (or a field) or primary link identifier information (or a field). That is, the primary link identifier bitmap may include information on the number of primary links or information for identifying primary links.

Hereinafter, in an MLD environment supporting a multi-link, an embodiment in which a non-AP MLD directly requests a primary link change (switching) and an embodiment in which the AP MLD performs a primary link change may be described.

The First Embodiment—Request to Change a Primary Link in Non-AP MLD

According to the first embodiment, the non-AP MLD may directly request the AP MLD to change the primary link. The technical characteristics of the Non-AP MLD changing its primary link can be largely divided into two types.

First, the Non-AP MLD can change the primary link by transferring the primary link function to another link. Second, the non-AP MLD may switch the primary link to another link.

Hereinafter, an embodiment in which the non-AP MLD transmits the primary link function to another link or converts the primary link to another link may be described. However, this is only an example, and the AP MLD may transfer the primary link function to another link or convert the primary link to another link.

An Embodiment of Transferring a Primary Link Function

According to an embodiment, when the non-AP MLD changes its primary link, the non-AP MLD may transfer a primary link function to another STA without separate link switching. For example, if the STA wants to avoid data congestion when transmitting UL traffic, the STA may change the link of another STA in the same non-AP MLD to operate as a primary link. A specific example of the above embodiment may be described with reference to FIG. 26.

Figure 26:
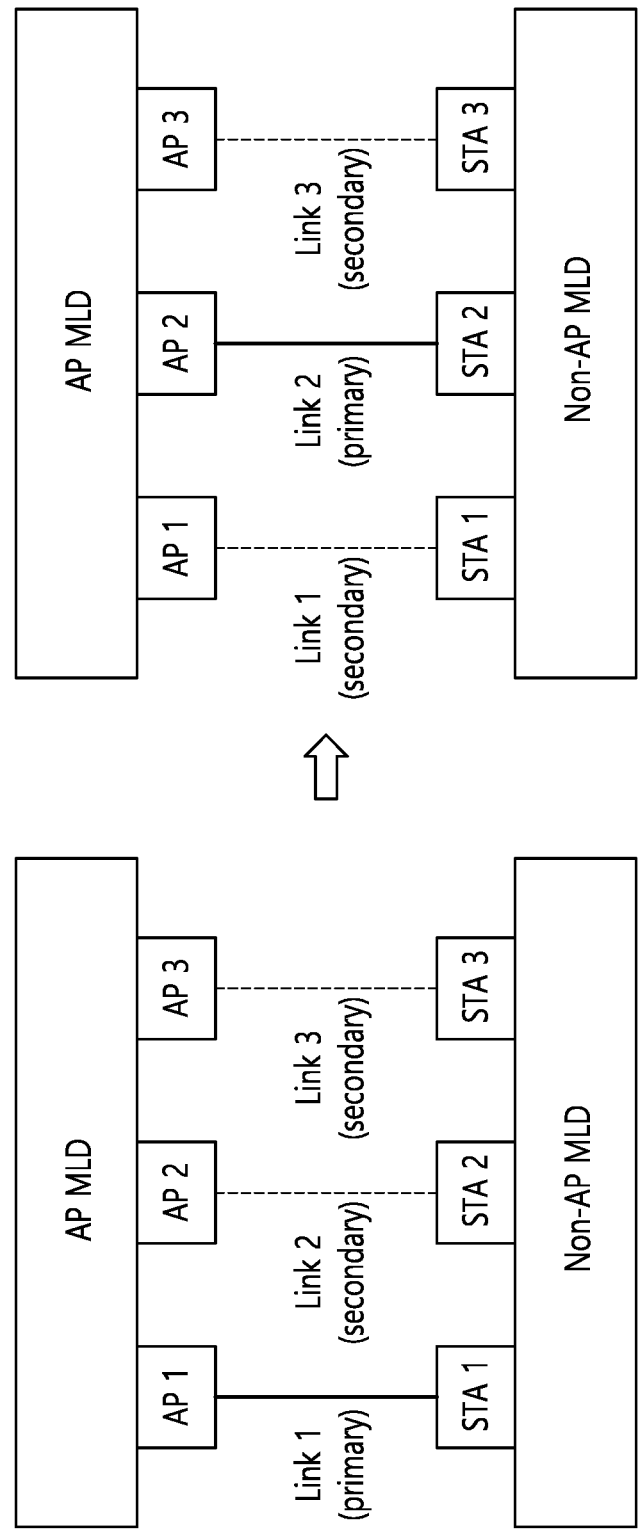
FIG. 26 shows an example in which a non-AP MLD transmits a primary link function.

FIG. 26 shows an example in which a non-AP MLD transmits a primary link function.

Referring to FIG. 26, the AP MLD may include AP 1, AP 2, and AP 3. The non-AP MLD may include STA 1, STA 2, and STA 3. AP 1 and STA 1 may be connected through link 1. AP 2 and STA 2 may be connected through link 2. AP 3 and STA 3 may be connected through link 3.

For example, link 1 may operate as a primary link. The non-AP MLD may change link 2 to a primary link by transferring the primary link function to link 2.

When the primary link function is transferred, the primary link may be changed through an agreement between the STA and the AP without a separate link re-setup. For example, if the non-AP MLD wants to change the primary link to link 2 while link 1 is operating as the primary link, the non-AP MLD can use link 2 as the primary link without a separate link reconnection.

In order to transfer the primary link function, the non-AP MLD may perform frame exchange for the primary link change agreement with the AP MLD.

For example, STA 1 may transmit a primary link change request message (or request frame) including information on a link to be changed to the AP MLD (for example, AP 1) through link 1. When the AP MLD accepts the primary link change request, the AP MLD may transmit a response message (or response frame) including the changed primary link information and a result code (for example, accept). Primary link information may be omitted in the response message.

The non-AP MLD may receive a response message accepting the change of the primary link from the AP MLD. The non-AP MLD may change its primary link based on the response message.

The frame used in the above-described primary link change process may be a conventional standard management frame or a frame newly defined for the primary link change.

Frame exchange for changing the primary link may be performed through an existing primary link or through another link of the same non-AP MLD (for example, a link to be changed to a primary link).

Example of Switching/Changing Primary Link

According to an embodiment, when a non-AP MLD changes its primary link, a separate link switching operation/process may be performed. For example, the non-AP MLD may reconnect a link other than the primary link as the primary link.

For example, the state of an AP connected as a primary link may be disabled. In this case, the STA may reconnect a link other than the primary link as a new primary link. A specific example of the above embodiment may be described with reference to FIG. 27.

Figure 27:
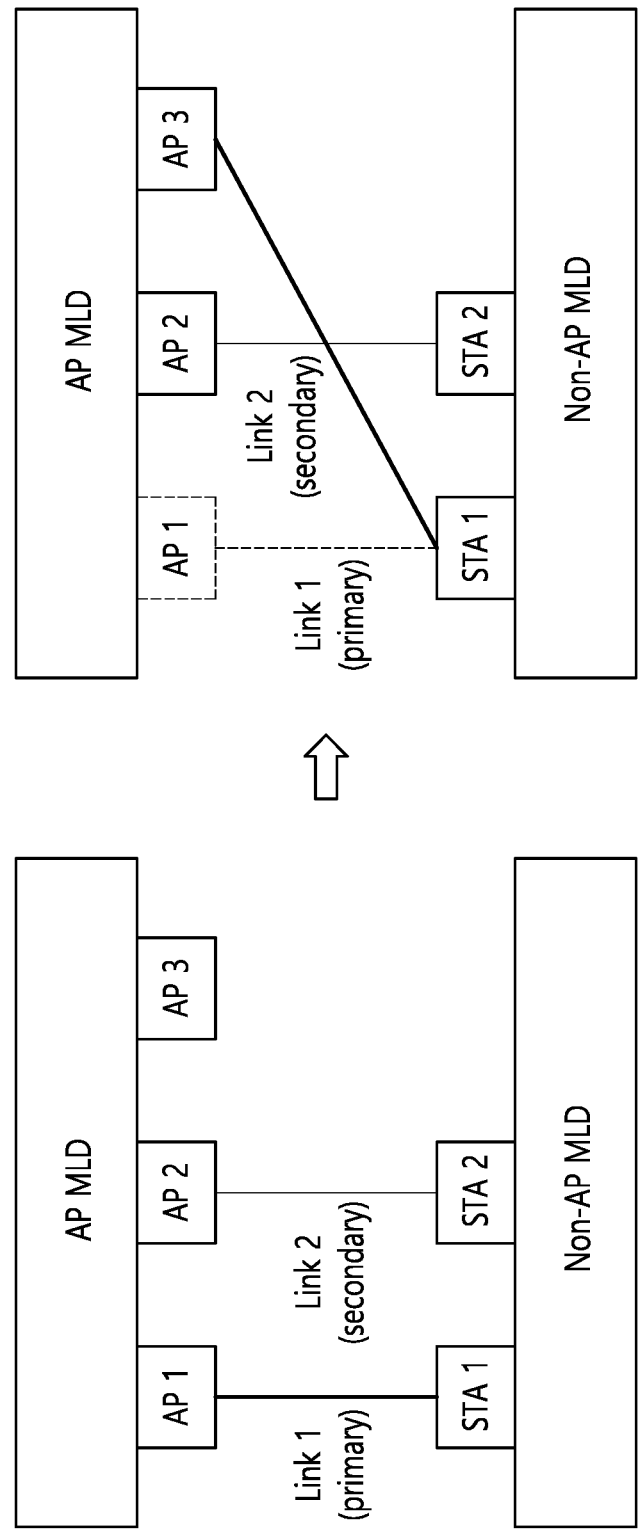
FIG. 27 shows an example in which the non-AP MLD changes the primary link.

FIG. 27 shows an example in which the non-AP MLD changes the primary link.

Referring to FIG. 27, the AP MLD may include AP 1, AP 2, and AP 3. The non-AP MLD may include STA 1 and STA 2. AP 1 and STA 1 may be connected through link 1. AP 2 and STA 2 may be connected through link 2. Link 1 may operate as a primary link. The non-AP MLD may change the primary link by disconnecting from AP 1 and establishing a connection with AP 3.

Specifically, the Non-AP MLD may change the primary link from link 1 to link 3 by reconnecting the primary link. In other words, the Non-AP MLD may configure link 3, which was not operating as a multi-link, as a primary link. That is, the Non-AP MLD may release link 1 connected to STA 1. Thereafter, the Non-AP MLD may connect STA 1 to link 3. In addition, the Non-AP MLD may configure link 3 as a primary link. As a result, the Non-AP MLD may release link 1, which is the primary link. In addition, the Non-AP MLD may establish a connection with link 3 that was not connected, and configure link 3 as a primary link.

For example, when changing the primary link, a separate link reconnection (for example, association) process may be required. If the AP operating as the primary link (for example, AP 1) is turned off, the non-AP MLD must configure a new primary link.

As an example, AP 1 operating as an existing primary link of a non-AP MLD may be turned off. The non-AP MLD must establish a new primary link.

According to an embodiment, if AP 2 (that is, Link 2) is one of the primary links supported by the AP MLD, only the primary link function may be transmitted to the STA 2 as shown in FIG. 26.

According to an embodiment, AP 2 (that is, Link 2) may not be one of the primary links supported by the AP MLD. For example, AP MLD may support AP 1 (or link 1) and AP 3 (or link 3) as a primary link set. In this case, as shown in FIG. 27, the non-AP MLD needs to be newly connected with AP 3 of the AP MLD. Therefore, unlike the embodiment of FIG. 26, since STA 1 needs to perform a new connection to AP 3, a link reconfiguration process may be required along with the link change. In other words, STA 1 must perform link change and link re-establishment. That is, when STA 1 reselects the primary link to AP 3, it must also perform a link reconfiguration process.

Specifically, when AP 1 is turned off, STA 1 may attempt to establish a new primary link with another AP in the AP MLD. STA 1 may establish a connection with AP 3 through link reconfiguration (for example, association). Thereafter, STA 1 and the AP may perform frame exchange for a primary link establishment request.

For example, STA 1 may transmit a frame for requesting primary link establishment to AP 1. When the AP 3 accepts the primary link establishment request, the AP 3 may transmit a response message including the changed primary link information and a result code (for example, an accept). When the AP 3 rejects the primary link establishment request, the AP 3 may transmit a response message including the existing primary link information and a result code (for example, a reject). In this case, the primary link information may be omitted in the response message.

The frame used in the above-described primary link change process may be a conventional standard management frame or a frame newly defined for primary link change.

Also, based on the multi-link characteristics, a frame exchange requesting to change the primary link to the AP 3 through another link (that is, link 2) of the non-AP MLD may be performed. Through the frame exchange, STA 2 may receive an authorization result code from AP 2. Thereafter, STA 1 may request STA 1 to re-establish a link to AP 3.

That is, the frame exchange for changing the primary link may be performed through the existing primary link or through another link of the same non-AP MLD (for example, a link to be changed to the primary link). In addition, after switching the primary link, a link reconfiguration process may be performed.

The Necessity of Requesting a Change of the Primary Link in the Non-AP MLD

According to an embodiment, the STA (or the non-AP MLD) may request to change the existing Primary Link. In the primary link, a management/control frame exchange, as well as data frames for all STAs of the non-AP MLD, may occur. Therefore, more data traffic can occur compared to the secondary link.

As shown in FIG. 23, STA 1, STA 3, and STA 6 may have the same Primary Link (that is, Link 1). If a lot of data traffic occurs on the primary link (that is, Link 1), load unbalancing may occur and transmission efficiency may decrease.

For example, when the amount of data transmitted to STA 1 is large, the transmission of a management frame to be transmitted to STA 3 and STA 6 may be delayed.

To solve this problem, the STA may directly request to change the primary link of the AP MLD. Hereinafter, an embodiment in which the non-AP MLD requests the AP MLD to change the primary link location and an embodiment in which the non-AP MLD requests to change information on the number of primary links allocated to the AP MLD may be sequentially described.

An Embodiment in which a Non-AP Multi-Link Device Directly Requests a Change of Primary Link Information When the non-AP MLD directly requests to change the primary link, it may be assumed that the non-AP MLD knows a list of all primary links supported by the AP MLD.

According to an embodiment, when the Non-AP MLD determines that the amount of data traffic to be received is large or wants to receive its own frame (for example, management frame) without delay, the Non-AP MLD may directly request a primary link change. For example, when a non-AP MLD wants to acquire QoS, the non-AP MLD could directly request a primary link change.

According to an embodiment, the non-AP MLD may directly request the AP MLD to change the primary link by designating its preferred link as the primary link. The non-AP MLD may include preferred primary link information in Primary Link Configuration element. The Non-AP MLD may transmit a request frame including the Primary Link Configuration element to the AP MLD. For example, a Management/Control frame (for example, (re) Association Request, etc.) may be used as the request frame.

The AP MLD may receive a request frame for changing the primary link.

For example, if the AP MLD accepts the change of the primary link, the AP MLD may transmit a response frame including the status code 'Accept' and changed link information (that is, primary link indication information) to the non-AP MLD through the existing primary link.

For another example, when AP MLD rejects the primary link change, the AP MLD may transmit a response frame including the existing primary link information along with the status code 'Reject' information to the non-AP MLD through the existing primary link.

Figure 28:
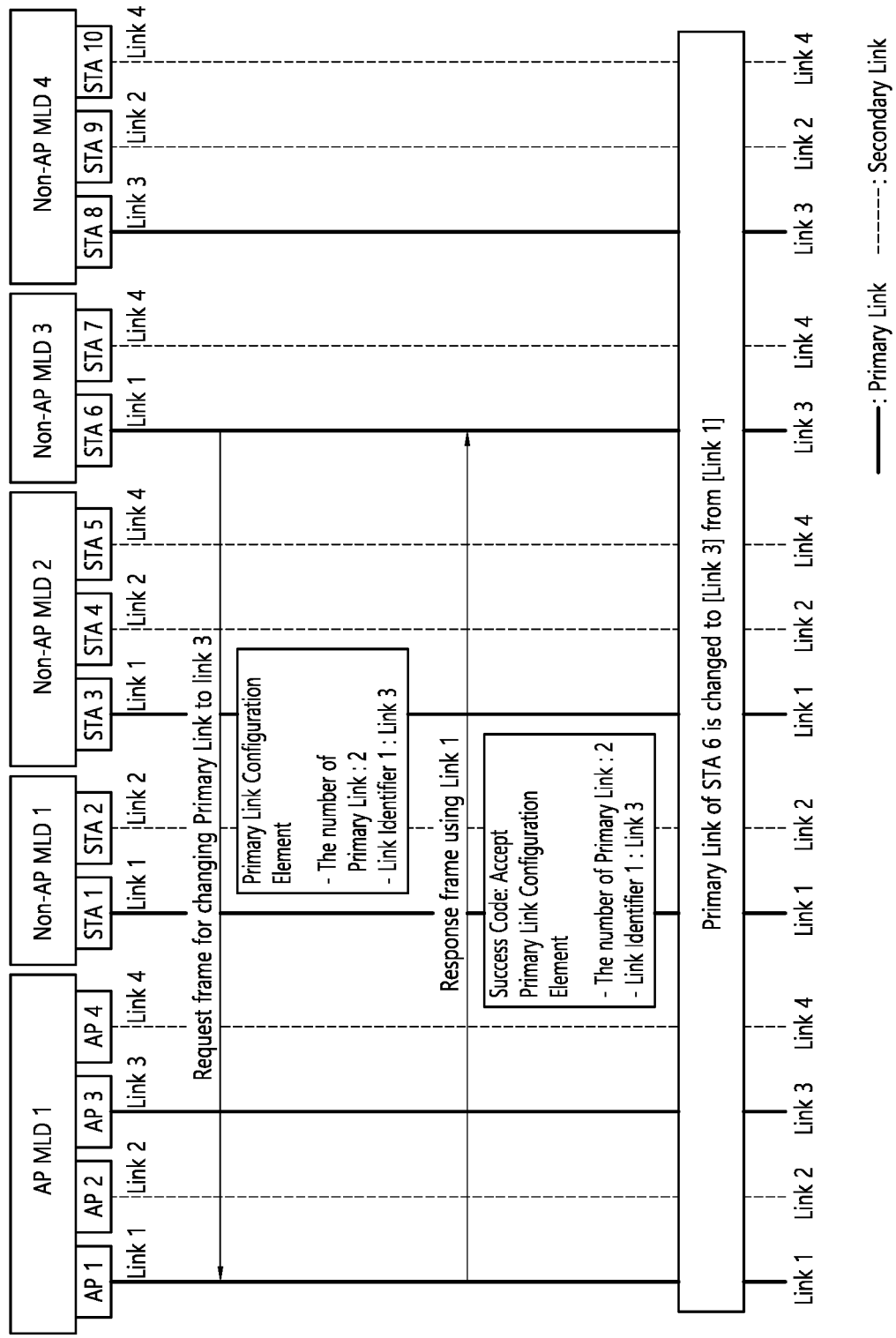
FIG. 28 shows an example of a primary link change procedure by a non-AP MLD.

FIG. 28 shows an example of a primary link change procedure by a non-AP MLD.

Referring to FIG. 28, a primary link change procedure by the non-AP MLD may be described based on the environment and structure of FIG. 23. That is, AP MLD 1, non-AP MLD 1, non-AP MLD 2, non-AP MLD 3, and non-AP MLD 4 may be related to AP MLD 1, non-AP MLD 1, non-AP MLD 2, non-AP MLD 3 and non-AP MLD 4 of FIG. 23.

According to an embodiment, when the STA 6 wants to acquire QoS for a frame to be transmitted to itself (for example, a management frame, etc.), the STA 6 may directly request the AP MLD 1 to change the primary link. It can be assumed that Non-AP MLD 3 has obtained Primary Link list information from AP MLD 1 and knows a link suitable for change.

STA 6 may transmit a request frame including Primary Link Configuration information (or Primary Link Configuration element) to AP MLD 1 through Link 1, which is an existing Primary Link. Accordingly, AP 1 may receive a request frame for requesting a change of the primary link. In other words, non-AP MLD 3 may transmit a request frame including Primary Link Configuration information to AP MLD 1 through STA 6.

In order to accept the change of the primary link, the AP 1 may transmit a response frame including the status code and information on the primary link to be changed to the STA 6 through the existing primary link, Link 1. In other words, AP MLD 1 may transmit a response frame including a status code and information about a primary link to be changed to non-AP MLD 3 through AP 1. AP MLD 1 can set the status code to 'accept'. Also, AP MLD 1 may set the number of links operating as primary links to two, and may set information about the primary link to be changed as information about link 3.

Upon receiving the request frame, STA 6 may attempt to connect to a new primary link, Link 3, and then use Link 3 as a primary link.

An Embodiment in which the Non-AP MLD Requests a Change in the Number of Previously Allocated Primary Links According to an embodiment, the non-AP MLD may request the AP MLD to change the number of primary links. The non-AP MLD may use the Primary Link Configuration Element to request a change in the number of Primary Links. A specific example of the above embodiment may be described with reference to FIG. 29.

Figure 29:
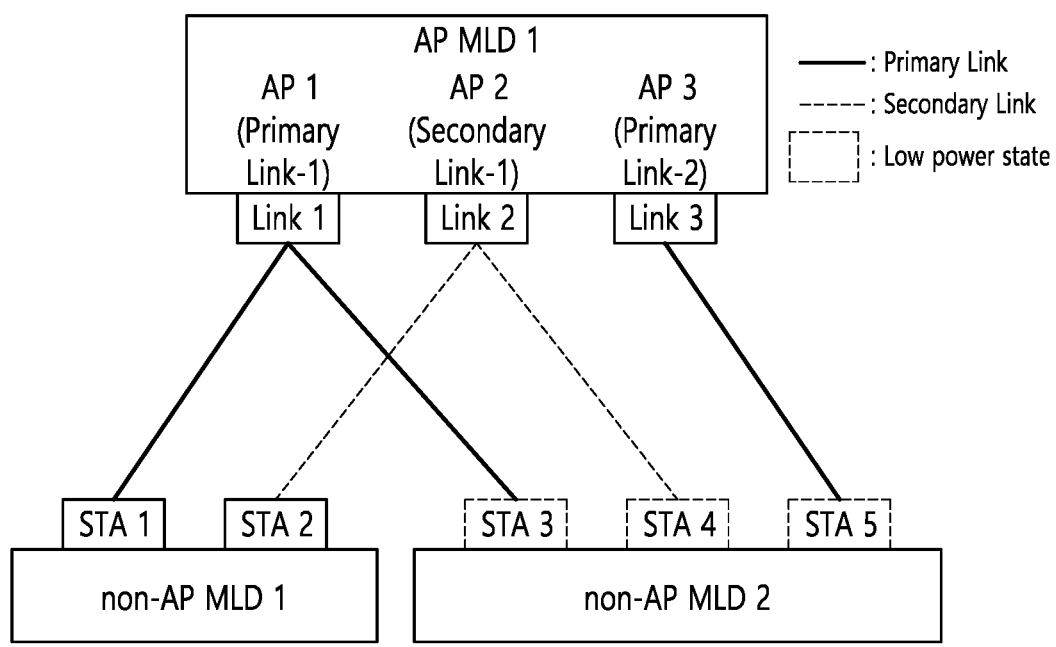
FIG. 29 shows an example of a procedure for changing the number of primary links by non-AP MLD.

FIG. 29 shows an example of a procedure for changing the number of primary links by non-AP MLD.

Referring to FIG. 29, Non-AP MLD 2 may enter a low power mode for each STA in order to reduce power consumption. In order to reduce the number of primary links that consume a relatively large amount of power, the non-AP MLD 2 may transmit a request message for reducing the number of primary links from two to one to the AP MLD 1.

Specifically, non-AP MLD 2 may use link 1 and link 3 as primary links. The non-AP MLD 2 may transmit a request message for reducing the number of primary links from 2 to 1 to the AP MLD 1 in order to reduce power consumption.

A specific operation for the non-AP MLD 2 to request a change in the number of primary links may be described with reference to FIG. 30.

Figure 30:
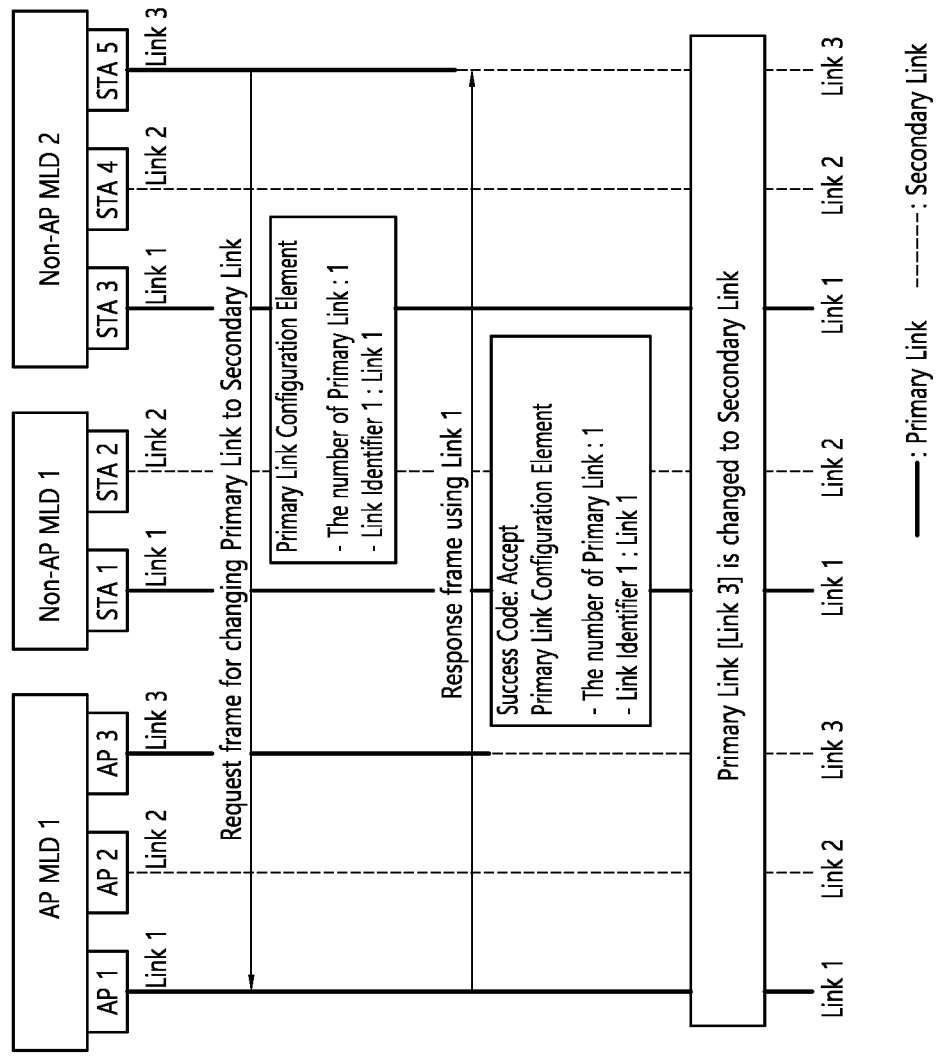
FIG. 30 shows a specific example of a procedure for changing the number of primary links by a non-AP MLD.

FIG. 30 shows a specific example of a procedure for changing the number of primary links by a non-AP MLD.

Referring to FIG. 30, the non-AP MLD 2 may request the AP MLD 1 to change the number of primary links in order to reduce power consumption. The non-AP MLD 2 may transmit a Request frame including a Primary Link Configuration element.

The request frame may include information on the number of Primary Links that non-AP MLD 2 wants to change and Link Identifier information. For example, since non-AP MLD 2 requests to change Link 3 to a secondary link, the number of primary links may be set to one. In addition, the primary link identifier may include only information on Link 1. The non-AP MLD 2 may transmit a request frame including the above-described information to the AP MLD 1. AP MLD 1 may receive the request frame.

For example, AP MLD 1 may accept a change in the number of primary links.

Specifically, AP MLD 1 may change Link 3, which previously operated as a primary link, to a secondary link. Thereafter, the AP MLD 1 may transmit a response frame including the status code "Accept" and the changed link configuration information to the non-AP MLD 2 through the existing primary link.

As another example, AP MLD 1 may reject a change in the number of primary links. Specifically, the AP MLD may transmit a response frame including the status code "Reject" information and the existing primary link information to the non-AP MLD 2 through the existing primary link. For example, in the existing primary link information, the number of Primary Link=2, link identifier 1=Link 1, and link identifier 2=link 3 may be configured. In other words, the existing primary link information may include the primary link number field, link identifier 1 field, and link identifier 2 field. The primary link number field may be set to a value indicating 2. The Link Identifier 1 field may be set to a value indicating link 1. The Link Identifier 2 field may be set to a value indicating link 3.

According to the above-described embodiment, the non-AP MLD may select and use a primary link suitable for its own data traffic or power amount by dynamically changing/adding a primary link/secondary link according to a situation.

The Second Embodiment—Change a Primary Link in AP MLD

According to the second embodiment, the AP MLD may switch the primary link assignment according to data traffic. The Necessity of a Primary Link Change in AP MLD According to one embodiment, in order to prevent the case where the data to be transmitted from the AP is skewed to one side, AP MLD could change the existing Primary Link.

In the primary link, management/control frame exchange, as well as data frames for all STAs of non-AP MLD, may occur. Therefore, more data traffic can occur compared to the secondary link.

As shown in FIG. 23, STA 1, STA 3, and STA 6 may have the same primary link (that is, Link 1). If a lot of data traffic occurs on the primary link (that is, Link 1), load unbalancing may occur and transmission efficiency may decrease.

For example, when the amount of data transmitted to STA 1 is large, the transmission of a management frame to be transmitted to STA 3 and STA 6 may be delayed.

To solve this, the AP MLD may request the non-AP MLD to change the primary link location. Also, the AP MLD may change the number of allocated Primary Links according to circumstances. In the following, when AP MLD supports one or more than one Primary Link, an embodiment in which the AP MLD requests a non-AP MLD to change a primary link and an embodiment in which information on the number of primary links to which the AP MLD is allocated may be sequentially described.

An Embodiment in which the AP MLD Requests the Non-AP MLD to Change the Primary Link According to an embodiment, the AP MLD may directly request the STA to change the primary link. AP MLD may support one or more primary links. In addition, STAs of non-AP MLD may select and connect one of the primary links of AP MLD after the association process or the association process. STAs of non-AP MLD may perform Management/Control frame exchange through only the selected primary link.

According to an embodiment, the AP MLD may determine that load unbalancing has occurred for a specific primary link. The AP MLD may instruct the non-AP MLD to change the primary link based on the traffic for each link.

For example, in the structure shown in FIG. 23, AP MLD 1 may determine that many STAs are concentrated in Link 1. AP MLD 1 may request the STAs to change the primary link to Link 3.

According to an embodiment, the AP MLD may transmit a request frame including a Primary Link Configuration Element to the STA through the existing primary link to change the primary link of the non-AP MLD. In this case, the request frame may be a management/control frame of a conventional standard or a frame newly defined for primary link change.

According to an embodiment, when the non-AP MLD accepts the primary link change request, the non-AP MLD may transmit/respond to the AP MLD with a response frame including the status code 'Accept' and the changed link information. For example, the non-AP MLD may respond to a primary link change request using a changed primary link or may respond to a primary link change request using an existing primary link. In other words, the non-AP MLD may transmit a response frame through the changed primary link or may transmit a response frame through the existing primary link.

That is, the non-AP MLD may respond as follows.
1) When Responding with a Changed Primary Link For example, the Non-AP MLD may receive a request frame. The request frame may include a Primary Link Configuration element. The non-AP MLD may transmit a response frame through the link indicated by the Link identifier of the Primary Link Configuration element. In other words, the non-AP MLD may change the primary link and transmit a response frame based on the Primary Link Configuration element.
2) When Responding with the Existing Primary Link (that is, the Link that Received the Request Frame)

For example, the Non-AP MLD can transmit a response frame through the link that has received the request frame. In other words, the Non-AP MLD may change the primary link after transmitting the response frame.

According to an embodiment, when the non-AP MLD rejects the primary link change request, the non-AP MLD may transmit/respond to the AP MLD with a response frame including the Status Code 'Reject' and the existing Link information through the existing primary link.

According to an embodiment, the AP MLD may have multiple primary links. In this case, the connection may be concentrated on a specific primary link (for example, Link 1 of FIG. 23). Also, due to DL data transmission for a specific STA, a management frame transmission delay for another STA may occur.

Accordingly, the AP (that is, the AP MLD) may request the non-AP MLD to change the primary link for data load balancing. A specific example of the above-described embodiment may be described with reference to FIG. 31.

Figure 31:
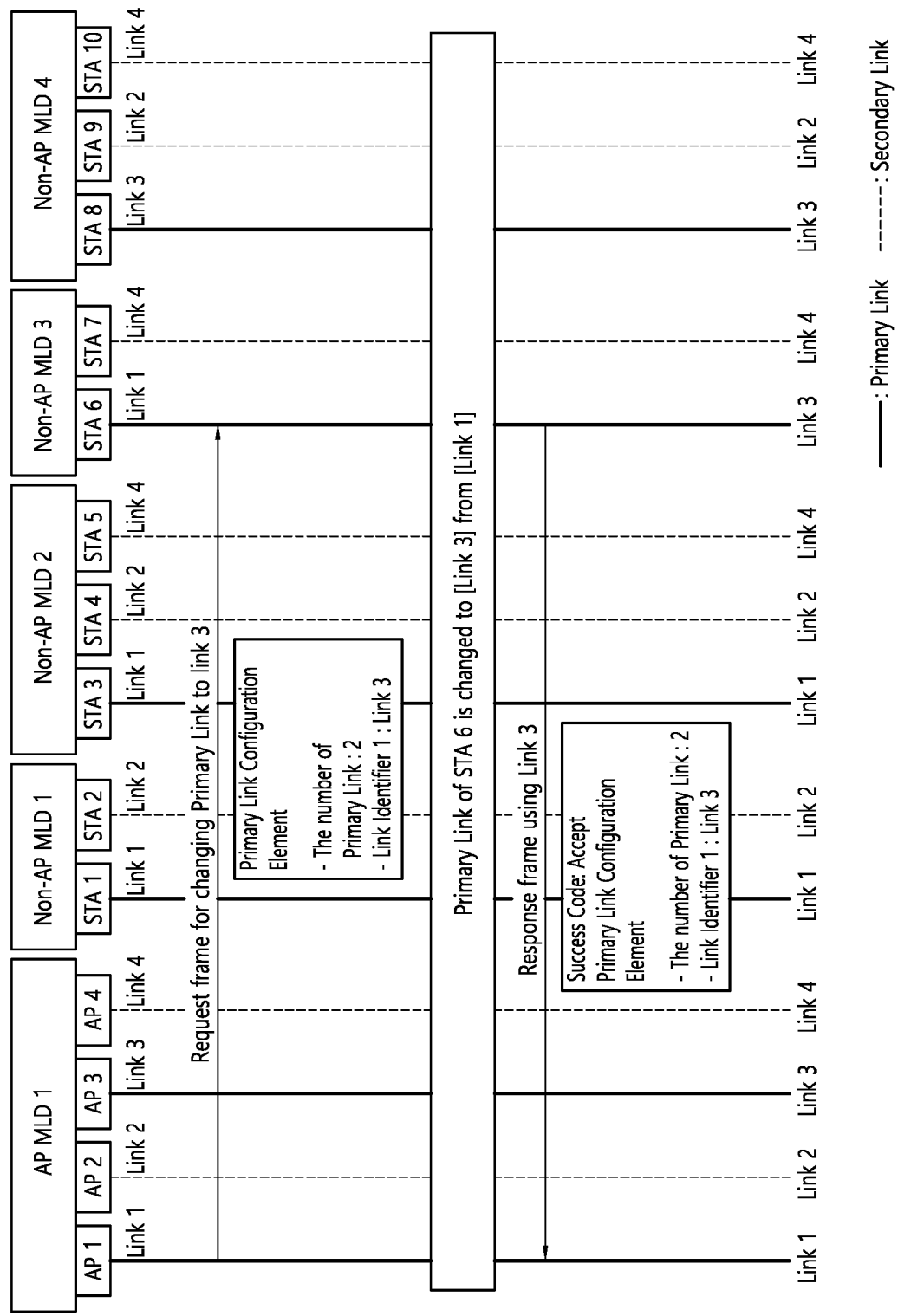
FIG. 31 shows an example of a primary link change procedure by AP MLD.

FIG. 31 shows an example of a primary link change procedure by AP MLD.

Referring to FIG. 31, a primary link change procedure by non-AP MLD may be described based on the environment and structure of FIG. 23. That is, AP MLD 1, non-AP MLD 1, non-AP MLD 2, non-AP MLD 3, and non-AP MLD 4 may be related to AP MLD 1, non-AP MLD 1, non-AP MLD 2, non-AP MLD 3 and non-AP MLD 4 of FIG. 23.

For example, it may be considered that data traffic is concentrated on Link 1, which is the primary link of AP MLD 1, resulting in a delay in data transmission of other STAs. In this case, AP MLD 1 may request a primary link change from STA 6 connected to Link 1.

Specifically, AP MLD 1 may transmit a request frame having Primary Link Configuration information to STA 6 of non-AP MLD 3 through Link 1 (that is, AP 1). The request frame may include information on the number of primary links currently supported by the AP MLD and primary link identifier information. That is, the AP MLD may transmit the request frame to the STA after including only the primary link list information desired to be changed in the field of the request frame. The STA may attempt re-association (that is, re-association) to one of the primary links in the primary link list based on the request frame.

In other words, there may be two primary links supported by AP MLD 1, Link 1 and Link 3. When AP MLD 1 requests a primary link change, AP MLD 1 may transmit only information about Link 3 in the Link Identifier field. For reference, when AP MLD 1 supports multiple primary links, one or more Link identifier fields may be included in the Primary Link Configuration element of the request frame. In other words, when AP MLD 1 supports a plurality of primary links, at least one Link identifier field may be included in the Primary Link Configuration element of the request frame. The STA may select one of the links indicated by at least one identifier field and use the selected link as its primary link.

For example, STA 6 receiving the request frame may accept the primary link change request. As an example, the STA 6 may transmit a response frame including a status code and its changed primary link information through Link 3, which is the changed primary link. As another example, STA 6 may transmit a response frame to Link 1, which is the existing primary link, and then change the primary link to Link 3.

An Embodiment in which the AP MLD Requests a Change in the Number of Previously Allocated Primary Links AP MLD can use Primary Link Configuration Element even when changing the number of primary links. To change the number of primary links, the AP MLD may transmit a request frame including the Primary Link Configuration Element to be changed to the non-AP MLD. The non-AP MLD that has received the request frame can check the changed Primary Link information included in the Primary Link Configuration Element.

The non-AP MLD may check the primary link list based on the changed primary link information. The non-AP MLD may attempt to connect to an appropriate link from the list of primary links.

For example, in the structure shown in FIG. 23, AP MLD 1 supporting two primary links may change the number of primary links, from Link 1 and Link 3 to Link 1, to a total of one. AP MLD 1 may transmit this information to STAs connected to Link 3 in order to change the number of links. That is, the AP MLD 1 may request a primary link change by transmitting the changed primary link information to the STA 8. A specific example of the above embodiment may be described with reference to FIG. 32.

Figure 32:
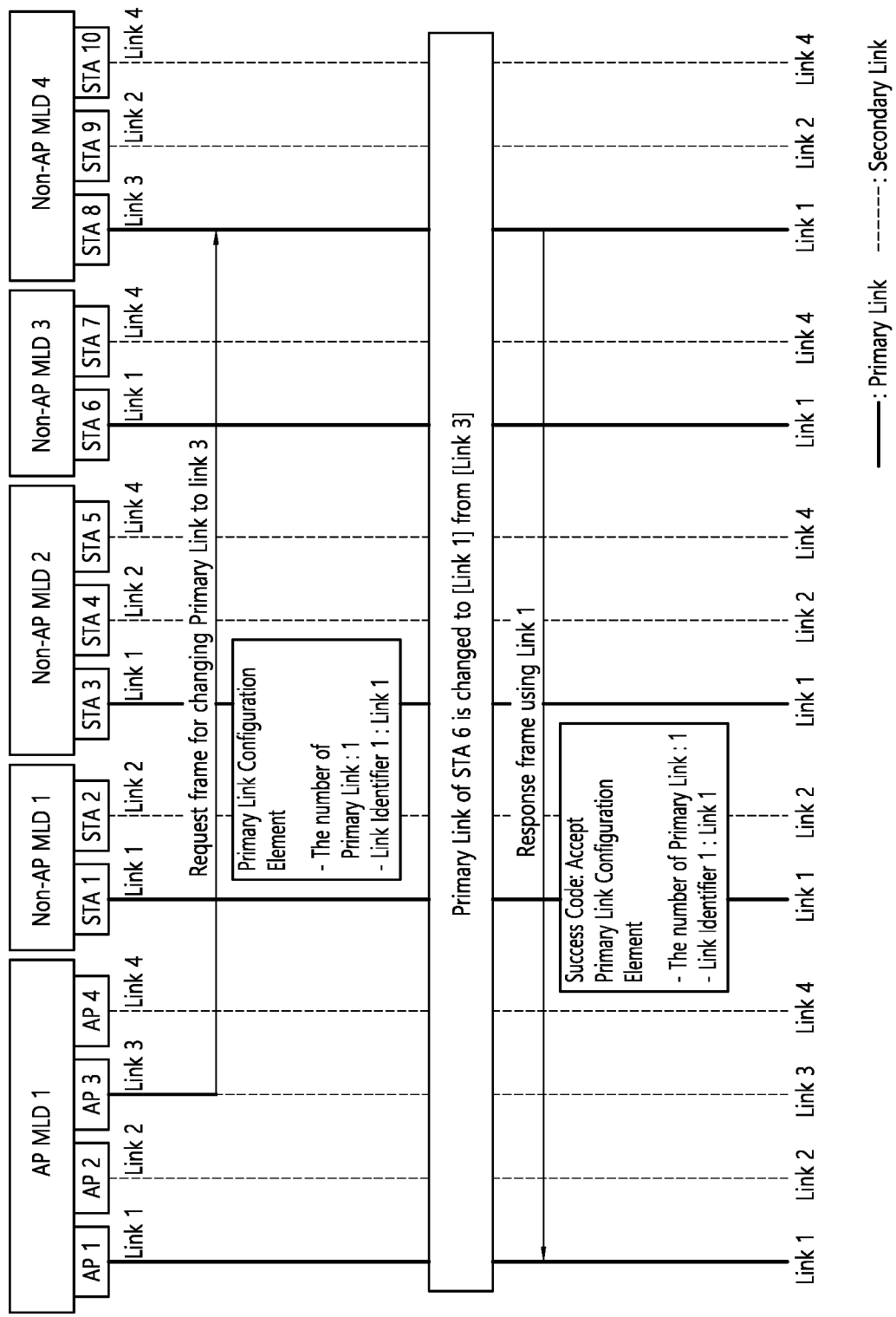
FIG. 32 shows an example of a procedure for changing the number of primary links by AP MLD.

FIG. 32 shows an example of a procedure for changing the number of primary links by AP MLD.

Referring to FIG. 32, AP MLD 1 may change the number of primary links from two to one. For example, AP MLD 1 may change Link 3 to a secondary link.

Specifically, AP MLD 1 may transmit a request frame requesting primary link change to STA 8 connected to Link 3. The request frame may include information on the changed number of primary links and information on the changed primary links list. In other words, the request frame may include information on the changed number of primary links and information on the changed primary links list. STA 8 may receive a request frame including the above information. For example, the request frame may include information indicating that the number of primary links is one and information indicating link 1 as a list of the primary link. Although Link 1 is configured as the list of the primary link in FIG. 32, however, this is an example. One or more links could be configured as a list of primary links.

When the STA 8 accepts the request to change the number of primary links, the STA 8 may perform link reconnection to change the primary link based on the primary link list information received from the AP MLD 1. The STA 8 may transmit a response frame including a status code and the changed primary link information through the changed primary link.

According to an embodiment, the STA 8 may attempt to change the primary link to Link 1 after responding to a response frame to Link 3, which is the existing primary link.

According to the above-described embodiment, the AP MLD may select and use a primary link suitable for its own data traffic or power amount by dynamically changing/adding a primary link/secondary link according to a situation. According to the above-described embodiment, there is an effect of improving data load balancing.

Figure 33:
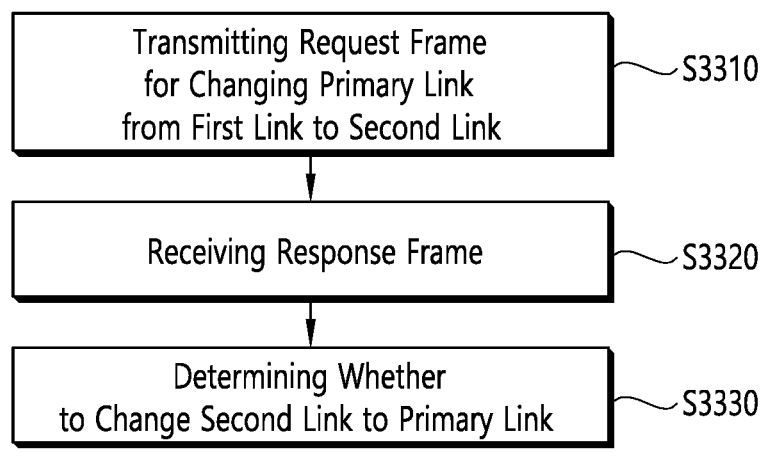
FIG. 33 is a flowchart for explaining the operation of a multi-link device.

FIG. 33 is a flowchart for explaining the operation of a multi-link device.

Referring to FIG. 33, in step S3310, the multi-link device (MLD) may transmit a request frame for changing a primary link from a first link to a second link.

According to an embodiment, the multi-link device may include a first STA and a second STA. For example, the first STA may be associated with the first link. As an example, the first STA may operate in the first link. In other words, the first STA may be connected to the first link. For example, the second STA may be associated with the second link. As an example, the second STA may operate in the second link. In other words, the second STA may be connected to the second link.

According to an embodiment, the first link may be included in one of 2.4 GHz, 5 GHz, and 6 GHz bands. In addition, the second link may also be included in one of the 2.4 GHz, 5 GHz, and 6 GHz bands.

According to an embodiment, the first link may be configured by a combination of at least one channel included in the 2.4 GHz, 5 GHz, and 6 GHz bands. The second link may also be configured by a combination of at least one channel included in the 2.4 GHz, 5 GHz, and 6 GHz bands.

According to an embodiment, the first STA may include a first processor and/or a first transceiver. Also, the second STA may include a second processor and/or a second transceiver.

For example, the first STA and the second STA may be controlled by the processor of the multi-link device and may operate by the processor of the multi-link device. For example, the processor of the multi-link device may request the processor of the first STA to transmit/receive a signal through the first link. The processor of the first STA may transmit/receive a signal through the first link in response to the request.

For another example, the first STA and the second STA may operate independently. For example, the first STA may perform communication through the first link based on the first processor and the first transceiver. In addition, the second STA may perform communication through the second link based on the second processor and the second transceiver. The processor of the multi-link device may transmit information necessary for the multi-link operation to the first STA or the second STA. The first STA or the second STA may perform a multi-link operation based on information necessary for the multi-link operation.

According to an embodiment, the multi-link device may transmit a request frame for changing the primary link from the first link to the second link to the AP (for example, the first AP) through the first STA.

For example, the multi-link device may check the data traffic of the first link before transmitting the request frame. The multi-link device may transmit the request frame to the AP based on the data traffic of the first link. As an example, the multi-link device may check the data traffic of a first link configured as a primary link. The multi-link device may determine that data traffic of the first link is excessively allocated. Accordingly, the multi-link device may transmit a request frame for changing the primary link from the first link to the second link to the AP through the first STA (or the first link).

According to an embodiment, the request frame may include an information field (for example, a primary link configuration element). For example, the request frame may include first information about a link identifier (ID) of a second link. For example, the request frame may further include second information related to the number of links operating as primary links among a multi-link. For example, the multi-link may be configured with a plurality of links, and a primary link may be configured as at least one of the plurality of links.

In other words, the request frame may include information about the link ID of a target link that the multi-link device intends to configure as the primary link and/or information about the number of target links that the multi-link device intends to set as the primary link.

In step S3320, the multi-link device may receive a response frame. According to an embodiment, the multi-link device may receive a response frame from the AP through the first STA, based on the request frame.

In step S3330, the multi-link device may determine whether to change the second link to the primary link based on the response frame.

According to an embodiment, the response frame may include one of third information related to approval of change of primary link and fourth information related to rejection of a change of primary link.

For example, the response frame may include third information related to approval of the change of the primary link. The multi-link device may change the primary link from the first link to the second link based on the third information.

For example, the multi-link device may change the primary link from the first link to the second link by transferring the function of the primary link. In other words, the multi-link device may change the second link operating as the secondary link to operate as the primary link. Accordingly, the multi-link device may change the primary link from the first link to the second link without performing a link reconnection procedure. As a result, the multi-link device may change the first link from the primary link to the secondary link. Also, the multi-link device may change the second link from the secondary link to the primary link.

Thereafter, the multi-link device may exchange management frames through a second link that is a primary link. For example, when the second STA is connected to the second link, the multi-link device may exchange management frames through the second STA.

As another example, the response frame may include fourth information related to rejection of the primary link change. The multi-link device may maintain the primary link as the first link based on the fourth information.

Figure 34:
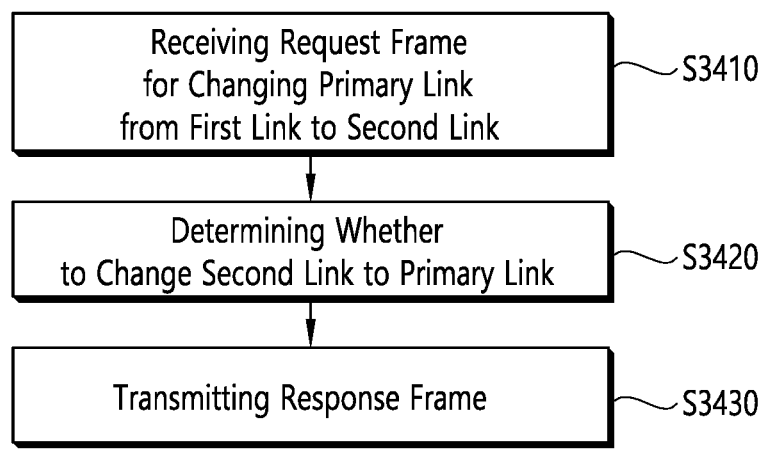
FIG. 34 is a flowchart for explaining the operation of an AP multi-link device.

FIG. 34 is a flowchart for explaining the operation of an AP multi-link device.

Referring to FIG. 34, in step S3410, the AP multi-link device may receive a request frame for changing a primary link from a first link to a second link.

According to an embodiment, the AP multi-link device may include a first AP and a second AP. For example, a first AP may be associated with a first link. As an example, the first AP may operate in the first link. In other words, the first AP may be connected to the first link. For example, the second AP may be associated with the second link. As an example, the second AP may operate in the second link. In other words, the second AP may be connected to the second link.

According to an embodiment, the first link may be included in one of 2.4 GHz, 5 GHz, and 6 GHz bands. In addition, the second link may also be included in one of the 2.4 GHz, 5 GHz, and 6 GHz bands.

According to an embodiment, the first link may be configured by a combination of at least one channel included in the 2.4 GHz, 5 GHz, and 6 GHz bands. The second link may also be configured by a combination of at least one channel included in the 2.4 GHz, 5 GHz, and 6 GHz bands.

According to an embodiment, the first AP may include a first processor and/or a first transceiver. The second AP may also include a second processor and/or a second transceiver.

For example, the first AP and the second AP may be controlled by a processor of the AP multi-link device, and may be operated by the processor of the AP multi-link device. For example, the processor of the AP multi-link device may request the processor of the first AP to transmit/receive a signal through the first link. The processor of the first AP may transmit/receive a signal through the first link in response to the request.

For another example, the first AP and the second AP may operate independently. For example, the first AP may perform communication through the first link based on the first processor and the first transceiver. In addition, the second AP may perform communication through the second link based on the second processor and the second transceiver. The processor of the AP multi-link device may transmit information necessary for a multi-link operation to the first AP or the second AP. The first AP or the second AP may perform a multi-link operation based on information required for the multi-link operation.

According to an embodiment, the AP multi-link device may receive a request frame for changing the primary link from the first link to the second link from the STA (for example, the first STA) through the first AP.

According to an embodiment, the request frame may include an information field (for example, a primary link configuration element). For example, the request frame may include first information about a link identifier (ID) of a second link. For example, the request frame may further include second information related to the number of links operating as primary links among a multi-link. For example, the multi-link may be configured with a plurality of links, and a primary link may be configured as at least one of the plurality of links. In other words, the request frame may include information about the link ID of a target link that the multi-link device intends to configure as the primary link and/or information about the number of target links that the multi-link device intends to set as the primary link.

In step S3420, the AP multi-link device may determine whether to change the second link to the primary link. For example, the AP multi-link device may check the data traffic of the first link. The AP multi-link device may determine whether to change the second link to the primary link based on the data traffic of the first link.

In step S3430, the AP multi-link device may transmit a response frame. According to an embodiment, the AP multi-link device may transmit a response frame including information on whether to change the second link to the primary link to the STA through the first AP.

According to an embodiment, the response frame may include one of third information related to approval of change of primary link and fourth information related to rejection of a change of primary link.

For example, the AP multi-link device may transmit a response frame including third information related to approval for the change of the primary link. The AP multi-link device may change the primary link from the first link to the second link based on the response frame.

For example, the AP multi-link device may change the primary link from the first link to the second link by transferring the function of the primary link. In other words, the AP multi-link device may change the second link operating as the secondary link to operate as the primary link. Accordingly, the AP multi-link device may change the primary link from the first link to the second link without performing a link reconnection procedure. As a result, the AP multi-link device may change the first link from the primary link to the secondary link. Also, the AP multi-link device may change the second link from the secondary link to the primary link.

Thereafter, the AP multi-link device may exchange management frames through a second link, which is a primary link. For example, when the second AP is connected to the second link, the AP multi-link device may exchange management frames through the second AP.

For another example, the AP multi-link device may transmit a response frame including fourth information related to rejection for the change of the primary link. The AP multi-link device may maintain the primary link as the first link.

The technical features of the present disclosure described above may be applied to various devices and methods. For example, the above-described technical features of the present disclosure may be performed/supported through the apparatus of FIGS. 1 and/or 19. For example, the above-described technical features of the present disclosure may be applied only to a part of FIGS. 1 and/or 19. For example, the technical features of the present disclosure described above may be implemented based on the processing chips 114 and 124 of FIG. 1, may be implemented based on the processors 111 and 121 and the memories 112 and 122 of FIG. 1, or may be implemented based on the processor 610 and the memory 620 of FIG. 19. For example, the apparatus of the present disclosure includes a processor and a memory coupled to the processor. The processor may be configured to transmit, to an AP through a first STA related to a first link among a multi-link, a request frame for changing a primary link from the first link to a second link among the multi-link, wherein the request frame includes first information related to a link identifier (ID) of the second link; receive a response frame based on the request frame from the AP through the first STA; and determine whether to change the primary link to the second link based on the response frame.

The technical features of the present disclosure may be implemented based on a computer readable medium (CRM). For example, a CRM proposed by the present disclosure may store instructions which perform operations including the steps of transmitting, to an AP through a first STA related to a first link among a multi-link, a request frame for changing a primary link from the first link to a second link among the multi-link, wherein the request frame includes first information related to a link identifier (ID) of the second link; receiving a response frame based on the request frame from the AP through the first STA; and determining whether to change the primary link to the second link based on the response frame. The instructions stored in the CRM of the present disclosure may be executed by at least one processor. At least one processor related to CRM in the present disclosure may be the processors 111 and 121 or the processing chips 114 and 124 of FIG. 1, or the processor 610 of FIG. 19. Meanwhile, the CRM of the present disclosure may be the memories 112 and 122 of FIG. 1, the memory 620 of FIG. 19, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method comprising:
    transmitting, by an access point (AP) to a station (STA), a first management frame related to a power save mode,
    wherein the first management frame includes information related to a link identifier (ID) of a first link supported by the AP;
    receiving, by the AP from the STA, a second management frame based on the first management frame;
    determining, by the AP, whether to enter the power save mode for the first link based on the second management frame, wherein the AP does not enter the power save mode based on receiving the second management frame in response to the first management frame; and
    transmitting, by the AP, a physical protocol data unit (PPDU) through the first link to the STA,
    wherein the PPDU includes a legacy signal (L-SIG) field, a repeated L-SIG (RL-SIG) field being contiguous to the L-SIG field, and a first signal (SIG) field being contiguous to the RL-SIG field,
    wherein the L-SIG field includes a length field, and a value of the length field is set to satisfy a condition that a remainder is zero (0) when the value of the length field is divided by three (3), and wherein the first SIG field includes first information related to a PPDU type, second information related to an identifier of a basic service set (BSS), third information indicating duration information related to a transmission opportunity (TXOP), fourth information related to whether the PPDU is sent in uplink (UL) or in downlink (DL), fifth information related to a bandwidth, and sixth information having a length of 3 bits and indicating a physical (PHY) version of the PPDU.

2. The method of claim 1, wherein the first link is a primary link.

3. The method of claim 1, wherein the second management frame includes information related to approval of the first link.

4. The method of claim 1, wherein the first link is included in one of 2.4 GHz, 5 GHZ, and 6 GHz bands.

5. An access point (AP), comprising:
at least one processor; and
at least one computer memory operatively connected to the at least one processor and storing instructions that, based on being executed by the at least one processor, perform operations comprising:
transmitting, to a station (STA), a first management frame related to a power save mode, wherein the first management frame includes information related to a link identifier (ID) of a first link supported by the AP;
receiving, from the STA, a second management frame based on the first management frame;
determining whether to enter the power save mode for the first link based on the second management frame, wherein the AP does not enter the power save mode based on receiving the second management frame in response to the first management frame; and
transmitting a physical protocol data unit (PPDU) through the first link to the STA,
wherein the PPDU includes a legacy signal (L-SIG) field, a repeated L-SIG (RL-SIG) field being contiguous to the L-SIG field, and a first signal (SIG) field being contiguous to the RL-SIG field,
wherein the L-SIG field includes a length field, and a value of the length field is set to satisfy a condition that a remainder is zero (0) when the value of the length field is divided by three (3), and
wherein the first SIG field includes first information related to a PPDU type, second information related to an identifier of a basic service set (BSS), third information indicating duration information related to a transmission opportunity (TXOP), fourth information related to whether the PPDU is sent in uplink (UL) or in downlink (DL), fifth information related to a bandwidth, and sixth information having a length of 3 bits and indicating a physical (PHY) version of the PPDU.

6. The AP of claim 5, wherein the second management frame includes information related to approval of the first link.

7. The AP of claim 5, wherein the first link is included in one of 2.4 GHz, 5 GHz, and 6 GHz bands.

* * * * *